(12) United States Patent
Soliz et al.

(10) Patent No.: US 7,668,351 B1
(45) Date of Patent: Feb. 23, 2010

(54) SYSTEM AND METHOD FOR AUTOMATION OF MORPHOLOGICAL SEGMENTATION OF BIO-IMAGES

(75) Inventors: Peter Soliz, Albuquerque, NM (US); Mark Wilson, Albuquerque, NM (US); Balaji Raman, Albuquerque, NM (US)

(73) Assignee: Kestrel Corporation, Albuquerque, NM (US)

( * ) Notice: Subject to any disclaimer, the term of this patent is extended or adjusted under 35 U.S.C. 154(b) by 1005 days.

(21) Appl. No.: 10/760,923

(22) Filed: Jan. 20, 2004

Related U.S. Application Data

(60) Provisional application No. 60/440,911, filed on Jan. 17, 2003.

(51) Int. Cl.
*G06K 9/00* (2006.01)
(52) U.S. Cl. ............ 382/128; 382/117; 382/132; 382/224; 351/237; 356/401; 702/19
(58) Field of Classification Search ........ 351/237; 356/401; 382/117, 132, 224; 702/19
See application file for complete search history.

(56) References Cited

U.S. PATENT DOCUMENTS

| | | | | |
|---|---|---|---|---|
| 5,291,560 | A * | 3/1994 | Daugman | 382/117 |
| 5,689,340 | A * | 11/1997 | Young | 356/401 |
| 5,915,036 | A * | 6/1999 | Grunkin et al. | 382/132 |
| 6,990,239 | B1 * | 1/2006 | Nelson | 382/224 |
| 2005/0122477 | A1 * | 6/2005 | Alster et al. | 351/237 |
| 2005/0251347 | A1 * | 11/2005 | Perona et al. | 702/19 |

OTHER PUBLICATIONS

Berger, B.W. and Yoken, J., "Computer-Assisted Quantification of Choroidal Neovascularization for Clinical Trials," IOVS, 2000. 41(8): pp. 2286-2295.

Shin, D.S., et al., "Computer-Assisted Interactive Fundus Image Processing for Macular Drusen Quantitation," Opthalmology, 1999. 106 (No. 6): pp. 1119-1125.

Peli, Eli and Lahav, Moshe, "Drusen Measurement from Fundus Photographs Using Computer Image Analysis." Opthalmology, 1986. 93 (No. 12): pp. 1575-1580.

Peli, Eli, et al., "Feature-based Registration of Retinal Images." IEEE Transactions on Medical Imaging, 1987. MI-6(3): pp. 272-278.

Morgan, William H., et al., "Automated Extraction and Quantification of Macular Drusen from Fundal Photographs." Australian and New Zealand Journal of Opthalmology, 1994. 22(1): pp. 7-12.

(Continued)

*Primary Examiner*—Samir A. Ahmed
*Assistant Examiner*—Tsung-Yin Tsai
(74) *Attorney, Agent, or Firm*—Janeen Vilven; Peacock Myers, P.C.

(57) ABSTRACT

Medical images are automatically segmented by customizing the morphological segmentation of features identified in the image based upon statistical analysis of the features within each region to be analyzed. The statistical description of the features, as reported through a feature vector, informs the system as to which input variables to select for further segmentation analysis for features residing within the region of the image analyzed. By customizing the automatic segmentation analysis to produce an enhanced image, features within the image are characterized more efficiently and precisely. False positive identification of lesions are minimized without sacrifice of true positive identifications.

28 Claims, 25 Drawing Sheets
(5 of 25 Drawing Sheet(s) Filed in Color)

OTHER PUBLICATIONS

Ward, N.P., et al., "Image Analysis of Fundal Photographs." Opthalmology, 1989. 96: pp. 80-86.

Phillips, R.P., et al., "Quantification of Diabetic Maculopathy by Digital Imaging of the Fundus." Eye, 1991. 9(1): pp. 62-66.

Wilson, M., et al., "Computer-Aided Methods for Quantitative Assessment of Longitudinal Changes in Retinal Images Presenting With Maculopathy," in Medical Imaging 2002. San Diego, CA.

Bird, A.C., et al., "An International Classification and Grading System for Age-Related Maculopathy and Age-Related Macular Degeneration." The International ARM Epidemiological Study Group. Survey of Ophthalmology, 1995. 39(5): pp. 367-374.

Klein, Ronald, et al., "The Wisconsin Age-Related Maculopathy Grading System." Ophthalmology, 1991. 98(7): pp. 1128-1134.

Beucher, S. and Meyer, F., "The Morphological Approach to Segmentation: The Watershed Transformation." Mathematical Morphology in Image Processing, 1993: pp. 433-482, New York, E.R. Dougherty.

Otsu, N., "A Threshold Selection Method from Gray-Level Histograms." IEEE Transactions on Systems, Man and Sybernetics, 1979.

* cited by examiner

SYSTEM AND METHOD FOR AUTOMATION OF MORPHOLOGICAL SEGMENTATION OF BIO-IMAGES

CROSS REFERENCE TO OTHER APPLICATIONS

This application claims benefit under 35 U.S.C. § 119(e) of provisional application No. 60/440,911, filed Jan. 17, 2003, which is incorporated by reference herein, in its entirety, for all purposes.

STATEMENT REGARDING GOVERNMENT INTEREST

This invention was made with government support under Contract No. 2R44EY12174-02 and Contract No. 1R43EY014493-01A1 awarded by the National Eye Institute. The government has certain rights in the invention.

FIELD OF THE INVENTION

The present invention relates to a system and method for automatically segmenting morphological features and identifying biomarkers in organs such as the eye for use in medical diagnosis and research relating to the health of the organ and system.

BACKGROUND

Epidemiological studies, clinical trials of new drugs, and clinical monitoring of subjects with organ specific pathology which can be reflective of systemic disease depend greatly on precise measurements and characterization of the pathological lesions as well as anatomical or morphological features in the organ that are indicators of the health of the organ and system. For example, retinal diseases such as Age Related Macular Degeneration (ARMD), Diabetic retinopathy DR), Glaucoma and some systemic diseases having effects upon the eye, such as hyperlipidemia, arthrosclerosis, cylomegalovirus, cancer and hypertension for example depend greatly on precise measurements and characterization of pathological lesions as well as anatomical or morphological features in the eye. To date, quantization of the state of the disease as expressed by photographs or digital images has relied on the tedious task of an individual (grader) manually grading the images, for example retinal images, usually using 35 mm film, stereo viewers and light boxes.

For example, ARMD is the leading cause of irreversible visual loss among the elderly in the US and Europe. Epidemiological studies of ARMD vary in their outcomes using population-based prevalence studies. One of the reasons for such variance is the predominance in the use of qualitative methods to detect and characterize the lesions, for example drusen and choroidal neovascularization (CNV) associated with ARMD. Drusen are lipid deposits that occur in one of the retinal layers and present as light colored lesions in retinal photographs. Drusen represent an example of a type of biomarker that is indicative of disease in the eye. CNV is the more severe stage of the disease where the integrity of the blood vessels in the choroid has been compromised.

Although standardized protocols for detecting and classifying ARMD have been developed, these protocols depend extensively on highly trained "graders" to characterize morphological features (alternatively referred to as descriptors or aspects) of these lesions (alternatively referred to as "features of interest"). Features of interest can be described in terms of their shape, size, edges and color or any combination thereof, which are referred to as characteristics or feature characteristics. Consequently, there is a high degree of subjectivity, leading to inconsistencies in inter- and intra-grader comparisons, which leads to increased errors or uncertainty in the analysis data.

For example, when diagnosing and managing ARMD, graders will manually estimate the numbers, sizes, locations, and spatial extent of lesions at each point in the subject's history based on a rigorous protocol.

A similar situation is present when attempting to quantitate the state of retinopathy in the retina caused by diabetes. Graders qualitatively assess the image to be analyzed by visually comparing it to a standard. There is no explicit attempt to quantitate the disease, for example, by counting the number of micro-aneurysms (MA), or measuring the area of neovascularization on the retina.

Because of time constraints imposed on the graders and the human's limited visual perception capabilities, the grader's accuracy for comprehensively counting and estimating size and area are significantly affected for subjects with a large number of lesions. Similarly, in clinical trials, the precision in measuring the changes in lesions will impact the statistical analysis for assessing a drug's efficacy and/or safety. In the clinic, determining the rate of a disease's progression over time requires exact measures of the lesion or retinal feature being monitored during longitudinal studies.

Interest in automating the analysis and diagnosis of medical or bio-images has been reflected in the increasing number of publications addressing the need and describing the shortcomings of the attempts at segmentation, registration, and computer-aided diagnosis. For example, currently, the effort required by an expert retinal grader or clinical technician to precisely, accurately, and comprehensively quantitate all the pathological characteristics, morphological features or biomarkers in the eye that are indicative of eye disease and the health of the system is prohibitive. Typically, based on the grader's judgment, only the most critically significant or most salient lesions are analyzed.

BRIEF SUMMARY OF THE INVENTION

The present invention relates to a system and method for automatically segmenting morphological features and biomarkers identified in organs such as the eye for use in medical diagnosis and research as to the health of the organ and system.

The system and method of the present invention automatically segments medical images by customizing the morphological segmentation of features identified in the image based upon statistical analysis of the features within the region to be analyzed. The statistical description of the features as reported through a feature vector, informs the system as to which input variables to select for further segmentation analysis for features residing within the region of the image analyzed. By customizing the automatic segmentation analysis to produce an enhanced image, features within the image are characterized more efficiently and precisely.

A method for automatic image analysis can be carried out on a programmable machine such as a computer, having software instructions operating on the computer or embodied on a computer readable medium. The system is adapted to input the image, apply a gray level morphology algorithm and apply a feature algorithm wherein the gray level morphology algorithm input variable is selected based upon the feature vector calculated by the feature algorithm for the region under analysis. The feature vector algorithm characterizes features based upon user defined aspects of the feature, for example aspects of the feature characterized may be symmetry, skewness, edge sharpness, color and other shape delineators. For a user defined aspect that is characterized, a mathematical vector or feature vector is assigned. Analysis of the region of the image under review is customized in light of the feature vector calculated for that particular region. An image may have both regional and global feature vectors.

Further described is a method for characterizing features of interest in a digital image, wherein the image has multiple potential features of interest. Some of the potential features of interest may be noise. Removing the noise improves the quality of the image for medical screening and diagnosis analysis.

The false features are eliminated by characterizing all the relevant aspects of the feature of interest according to a first aspect or descriptor and eliminating those potential features of interest by filtering away those features having quantitative aspect value, for the relevant aspect or descriptor, that lies outside the range of a true lesion as defined by threshold value for the relevant aspect. Threshold values are selected from a receiver operating characteristic curve for the relevant aspect based upon a user defined input variable. The steps of identifying, characterizing and filtering features are repeated for each of one or more subsequent ordered aspects or descriptors until only true features or lesions remain in the image.

One aspect of the present invention provides an automated computer-based approach having significant correlation to the expert grader's manual technique.

Another aspect of the present invention provides accurate and precise mathematical characterization of features and monitoring of changes in features found in subjects with active eye disease.

Yet another aspect of the present invention overcomes a number of inherent challenges posed when segmenting retinal images.

One aspect of the present invention provides an automated diagnosis and analysis of eye disease or eye health by using retinal images to enhance the physician's ability to diagnose the state of eye disease, health and assay biomarkers with much greater sensitivity and specificity.

Another aspect of the present invention provides a computer-based system to efficiently and comprehensively measure more lesions in an organ such as the eye, beyond the most serious or salient lesions.

Another aspect of the present invention provides for monitoring longitudinal changes in eye pathologies.

Another aspect of the present invention provides for monitoring efficacy or safety of treatment.

Another aspect of the present invention provides for monitoring toxicity of drugs.

Another aspect of the present invention provides for automatically screening for eye disease in broad scale population bases.

One aspect of the present invention provides the epidemiologist and clinical ophthalmologist with a tool that automatically and accurately locates and measures the lesions in subjects with ARMD, DR, or other diseased organs.

Yet another aspect is to reduce the variance created by inter- and intra-grader variability thereby allowing the clinician to track more precisely longitudinal changes in subjects with ARMD, DR, or other diseased organs.

Yet another aspect of the present invention provides an automatic fundus "grading" system that does not attempt to emulate the visual perception processes of the human grader, but mathematically characterizes the images, and correlates the features to the stage of the disease.

Another aspect of the present invention provides for a method to analyze statistical features correlating with disease outcome or progression and with the previous analysis methods.

Another aspect of the present invention provides identification of "features" which are used as quantitatively derived biomarkers to deterministically classify organ disease. These biomarkers are used to assign grades to the images thereby facilitating screening and diagnosis. The implementation of this approach may be a supplement to human-based grading, by adding another data point for care givers consideration, or as an independent means for grading large sets of images automatically.

Another aspect of the present invention provides a quantitative system and method of measuring biomarkers in the eye to assist in diagnosing eye disease and systemic health.

Another aspect of the present invention provides a quantitative system and method of measuring biomarkers in the eye to assist in evaluating therapeutic modalities as treatments for eye disease.

Another aspect of the present invention is to improve the scoring large numbers of small lesions of the eye that may be ignored by manual graders.

Another aspect of the present invention is to decrease the time it takes to characterize images of the retina or other organs.

A further aspect of the present invention improves accuracy of medical image scoring by eliminating subjectivity from the scoring process.

Another aspect of the present invention provides a method for automatically analyzing multiple modalities from medical images and comparing multiple images for scoring during longitudinal studies of the retina or other organ.

Another aspect of the present invention provides standardized scoring methods. Yet another aspect of the present invention provides an automatic segmentation system that does not attempt to apply universal criteria for any image analyzed but instead customizes the analysis process in light of the statistical feature characteristics within each image for each image analyzed.

Yet another aspect of the present invention provides an automatic image filter to remove substantial noise from the analysis field wherein the noise comprises false positives or false features that would otherwise be characterized during the analysis, screening and diagnosis.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Additional objects and advantages of the present invention will be apparent in the following detailed description read in conjunction with the accompanying drawing figures.

DETAILED DESCRIPTION

Although described herein with respect to preferred embodiments, the present invention is not meant to be so limited, and other modifications and embodiments that fall within the scope of the present invention will be readily apparent to those of skill in the art.

According to one embodiment of the present invention an automated system and method provides for mathematically segmenting morphological features and biomarkers in an image of an organ (for example the eye) wherein analysis is customized to the characteristics of each image.

Certain embodiments of the present invention incorporate a programmable computer having one or more algorithms based on mathematical morphology feature extraction and segmentation for automatically manipulating, analyzing and scoring images of an organ.

Another embodiment of the present invention provides segmentation of features in an image, such as biomarkers in the eye which may be eye lesions for example micro-aneurysms, and obtaining statistical delineators that describe the characteristics of the feature which are used for processing of feature dimensions and temporal information further enhancing the image for the feature of interest.

Embodiments of the system and method of the present invention exploit those attributes of computer and digital images thereby allowing for accurate measures of longitudinal changes and quantifies inter-subject simulation and difference. Physical features, (for example the vasculature), and biomarkers, (for example drusen and MAs), are not ignored; rather, the processes couple automatic segmentation of morphological features such as biomarkers in the eye, and other pathological signs of disease, for example diabetic retinopathy (DR) or age-related macular degeneration (ARMD) with vigorous mathematical characterization of "features", such as texture roughness, coarseness, directionality, contrast, entropy, homogeneity, shape, size, color, symmetry and skewness, as well as other mathematical characterizations that will be obvious to those of ordinary skill in the art.

Figure 1:
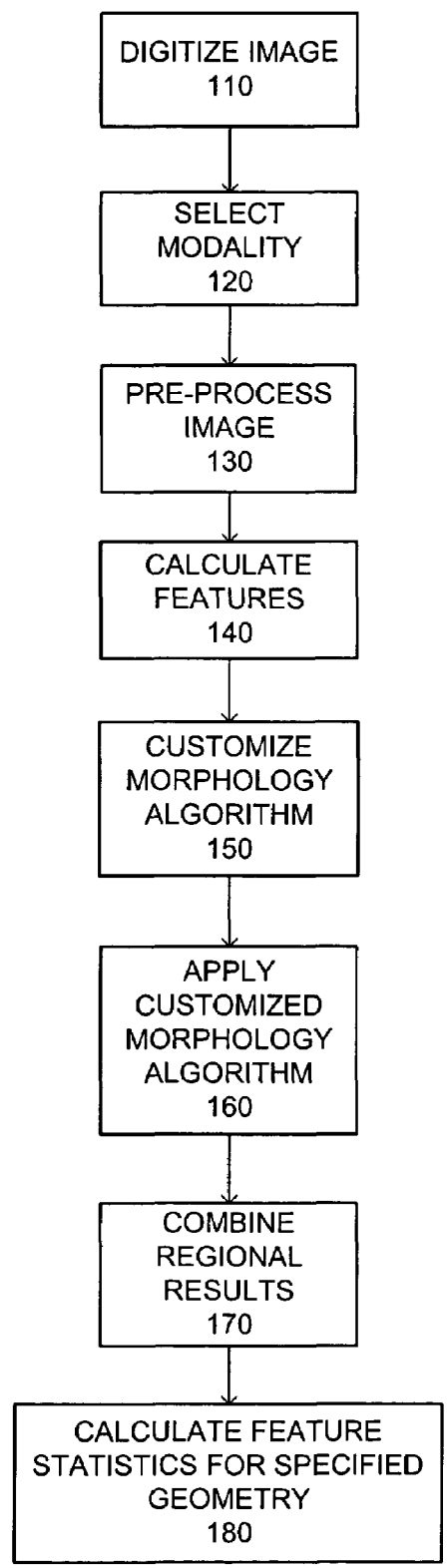
FIG. 1 illustrates a flow chart for a process according to one embodiment of the present invention that automatically segments features within an image.

One embodiment of the present invention is illustrated in the schematic of FIG. 1. Referring now to FIG. 1, images obtained from an organ may be obtained with an imager attached to a detector having 35 mm, video, or digital imaging capabilities. For images that are not digitally acquired, the image is digitized 110. Imagers may be a fundus scope, broncoscope, dermascope, or other.

Depending on one or more features within the image that is of interest, the best modality (fluorescein angiography (FA), indocyanine green (ICG), infrared (IR), autofluorescence, etc.) for viewing a feature will be selected 120. For example, the best results for obtaining an image of a retina and analyzing drusen within the retina, the green modality can be selected.

Whichever modality is selected, the image in that modality is pre-processed 130. Pre-processing of an image can involve removing illumination irregularities, camera effects and other related image artifacts. In addition, other various morphological features that are not of interest are segmented and removed, for example the optic disc or other related anatomical features that are not of immediate interest.

Statistical delineation of features within a particular region is calculated 140. The calculation involves characterizing, in statistical terms, the various features present within a user defined region. Through this process a feature vector for each region as defined by the user is calculated and expressed in terms of a feature vector representing a numerical value of the various features measured.

Multiple feature vectors can be created. Customize morphology algorithm to an image based upon input variable selected 150. Selection of input variables is based upon the classification of the feature vectors. A customized algorithm is applied to each region of the image under analysis 160. The results of the application of the optimized algorithm to each region are combined 170. Based upon the combination of the regional results, feature statistics are calculated for the specified geometry of the feature of interest in each image 180.

Location of important anatomical features are found automatically for precise orientation of images and to establish consistent coordinates for monitoring longitudinal changes and performing inter-subject comparisons.

Figure 2:
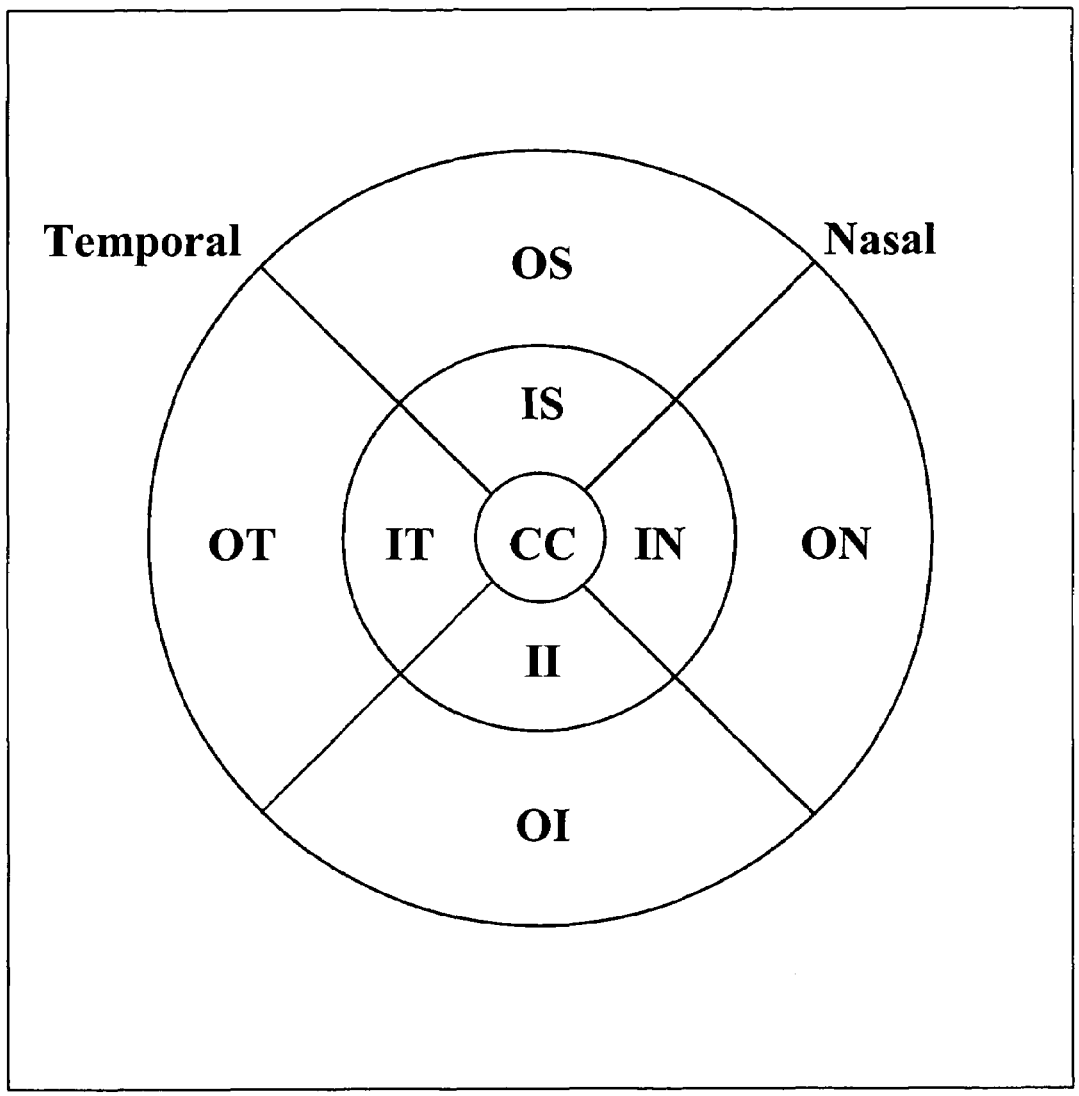
FIG. 2 illustrates Wisconsin age-related maculopathy grading system (WARMGS) grading grid overlay.

Regions of interest within an image are defined by the user and are located automatically through segmentation of certain anatomical features, such as the optic disc or fovea centralis. In the present example, regions within an image of the retina are defined according to the Wisconsin age-related maculopathy grading system (WARMGS) as illustrated in FIG. 2. The user defined regions are as follows: OS, IS, ON, OI, OT, IT, II, and CC. By automatically locating the grid that defines an anatomical site, precision and consistency are preserved.

A useful optional feature for use with the various embodiments of the present invention is a mouse-driven crosshair with paint and fill capabilities that enable drawing onto an image overlaying the digitized color fundus photograph. Optionally, the overlay can be toggled on and off and zoom capability up to about 300% included. Since the traditional grading uses stereo cues to determine the presence of drusen and other pathologies, it is a useful option for a grader to be allowed to view the stereo film slides for cueing.

Figure 3:
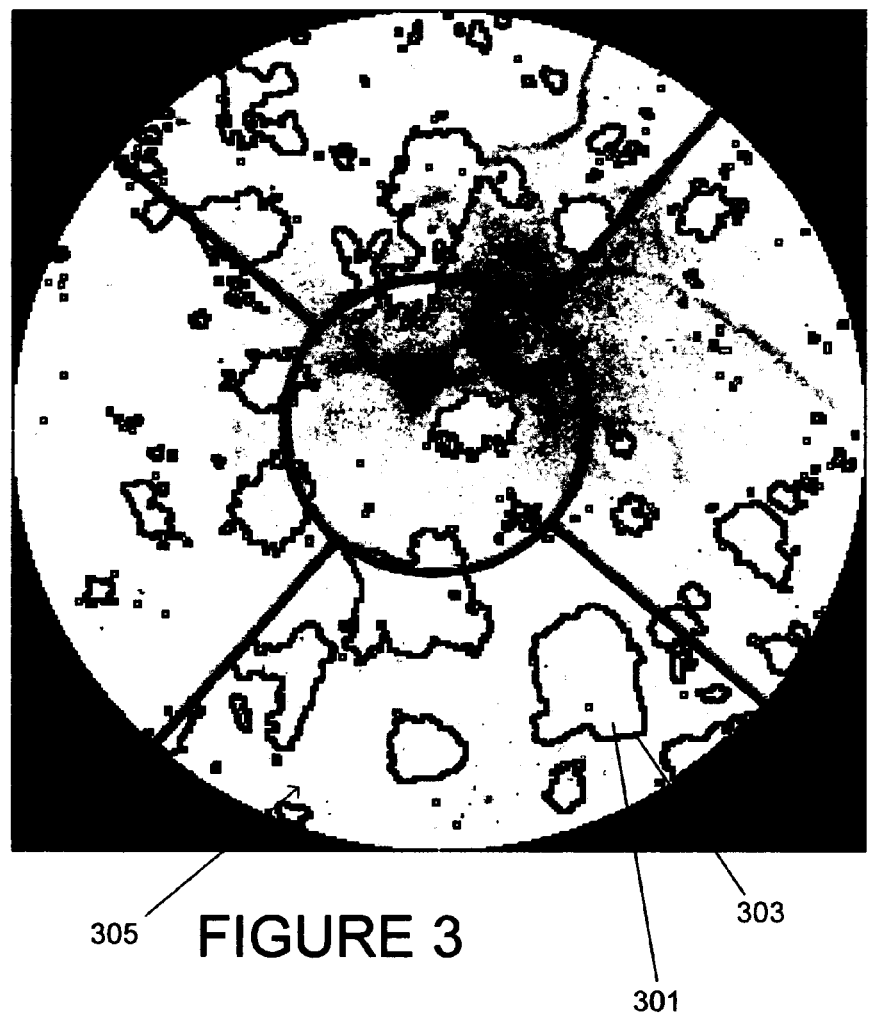
FIG. 3 illustrates an image of the retina with an overlay of WARMGS grid and grader drawn ground truth.

An example of an image analyzed for drusen by a human grader is illustrated in FIG. 3. The hand drawn contours 303 around features (drusen) 301 are identified in a user defined region 305.

Figure 4:
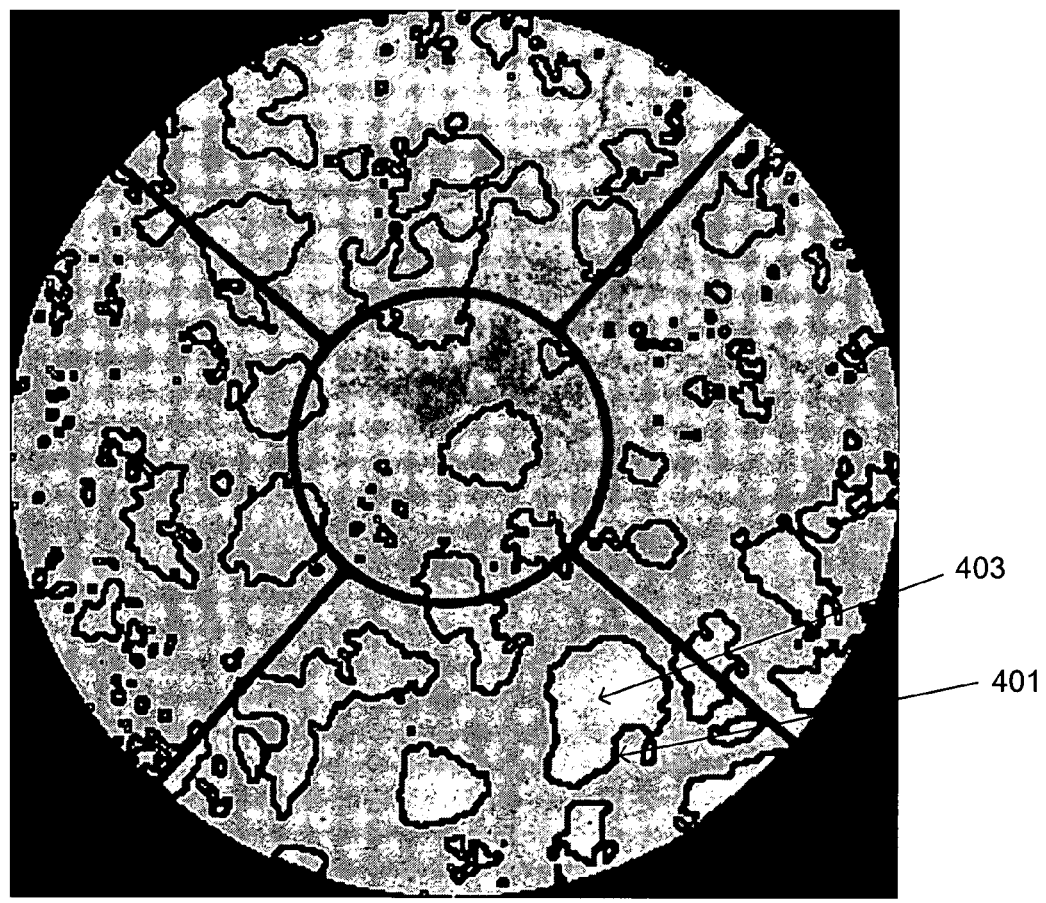
FIG. 4 illustrates automated segmentation image with WARMGS grading grid of same region of the retina as shown in FIG. 3 according to one embodiment of the present invention

FIG. 4 illustrates one result after segmenting the image in FIG. 3 with one embodiment of the present invention. The automatically drawn contours 401 around features (drusen) 403 are identified in the same user defined region as is illustrated in FIG. 3, 305.

In the current example, the original 30 degree field of view images are 35 mm color slides. The 35 mm color slides are digitized using a Nikon LS-2000 digital scanner, scanned at about 100 pixels per mm. The footprint of each pixel is approximately 3 micrometers on the retina. Other detectors such as digital cameras, and video cameras are preferred.

Figure 5:
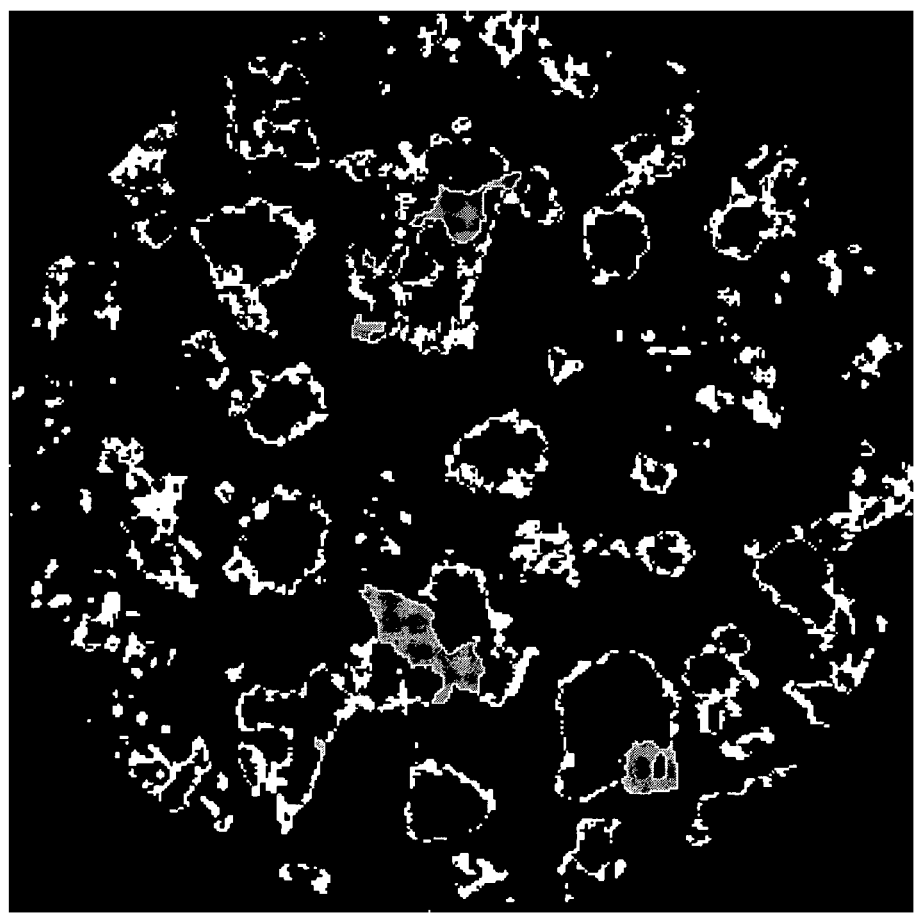
FIG. 5 illustrates comparison of grader drawn ground truth as illustrated in FIG. 3 with computer segmentation image as illustrated in FIG. 4 to produce overlay of ground truth and computer segmentation according to one embodiment of the present invention.

The overlay in FIG. 5 illustrates high agreement between the grader identified drusen and drusen identified after processing with one embodiment of the present invention. False positives are identified in gray. True positives are identified in black. False negatives are identified in white.

Figure 6:
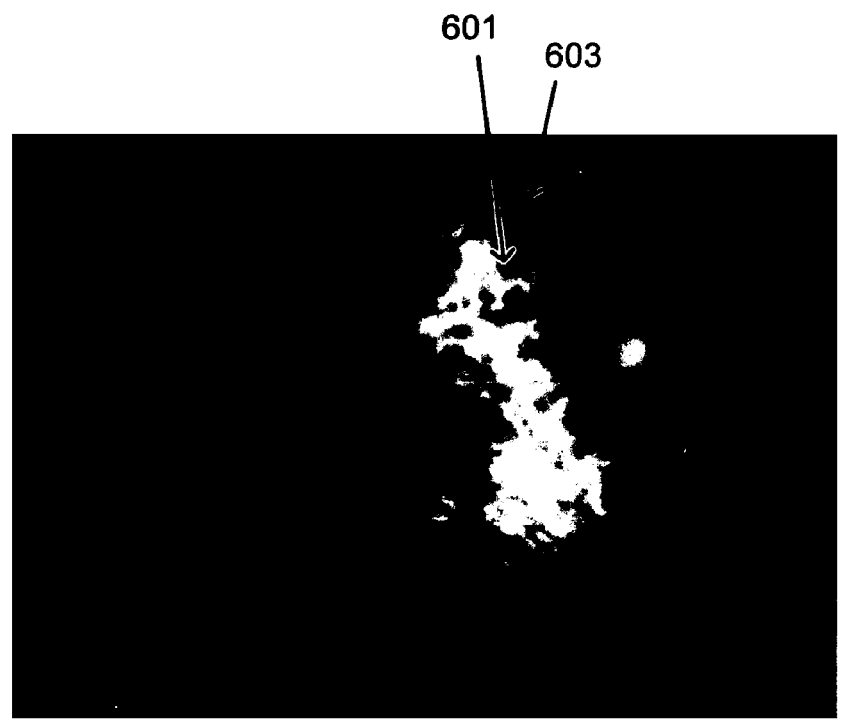
FIG. 6 illustrates the red, channels for typical retinal image.
Figure 7:
FIG. 7 illustrates the green channels for typical retinal images.
Figure 8:
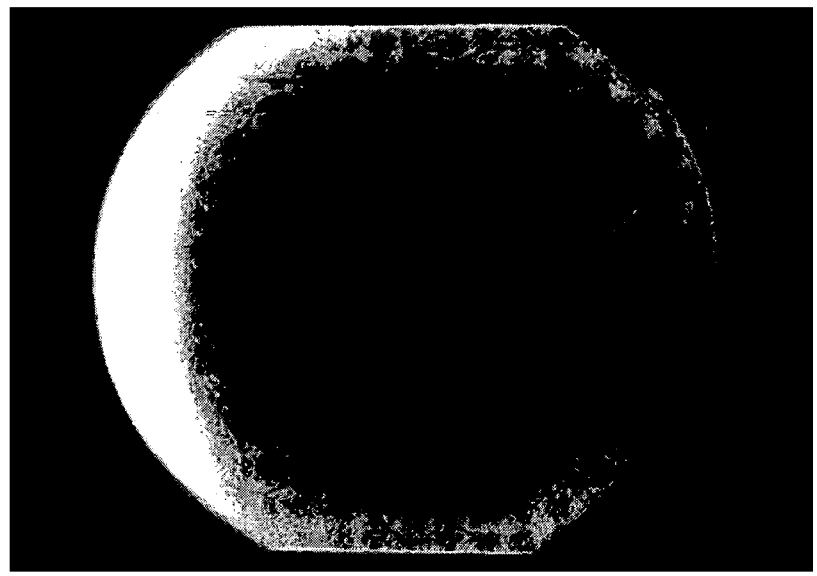
FIG. 8 illustrates the blue channels for typical retinal images.

FIGS. 6, 7, and 8 are retinal images illustrating information content of the individual modalities from which the image is acquired. In the current example the modalities are the Red, Green, and Blue color channels. FIG. 6 illustrates an example of an image of the retina in Red channel. The Red channel illustrated in FIG. 6 tends to depict structures in the choroids. The retinal vessel 603 and choroidal vessels 601 are visible.

FIG. 7 illustrates an example of an image of the retina in the green channel.

FIG. 8 illustrates an example of an image of the retina in the blue channel. The blue channel illustrated in FIG. 8 tends to be underexposed and adds little to the higher contrast green channel illustrated in FIG. 7.

As noted above in FIG. 1, processing of a retinal image by a segmentation algorithm in the green channel or modality provides a clear image of drusen. However, other modalities may be preferred when imaging other features of interest such as fluorescein angiography for detecting and defining classes of choroidal neovascularization.

Figure 9:
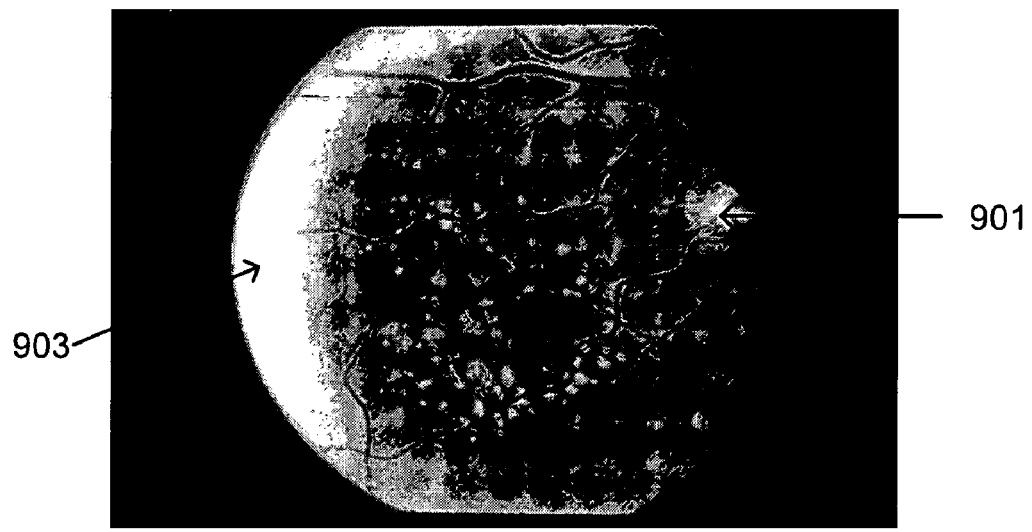
FIG. 9 illustrates retinal image showing lighting artifacts and optic disc

Referring now to FIG. 9, an image with lighting artifacts is illustrated. Pre-processing of the image removes the effects of image lighting artifacts 903 which are minimized prior to morphology segmentation. Other artifacts, for example, the optic disc 901 which appear as a bright region, are removed.

Pre-processing the image can be accomplished manually or automatically according to one embodiment of the present invention.

Figure 10:
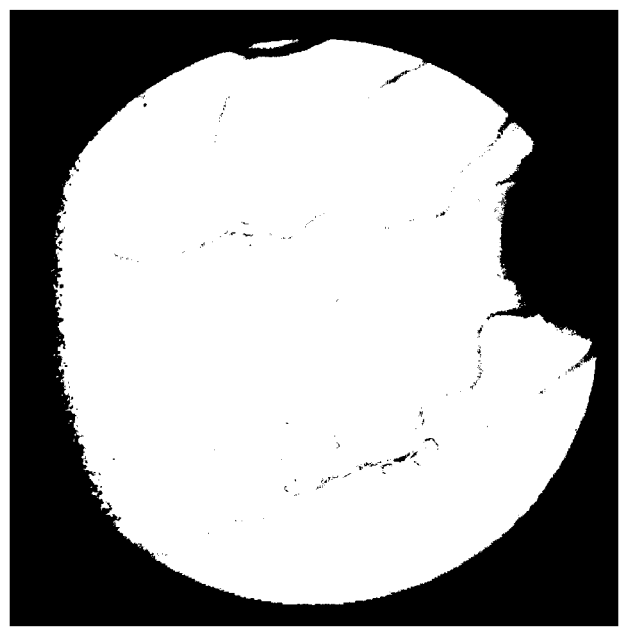
FIG. 10 illustrates processed image after removal of lighting artifacts and optic disc from retinal image as illustrated in FIG. 9 to produce processed image according to one embodiment of the present invention.

FIG. 10 illustrates effects of pre-processing an image that may be done either manually or automatically. In the present example "flattening" (or suppression) of lighting artifacts is illustrated. The lighting artifacts illustrated in FIG. 9 are removed.

Figure 11:
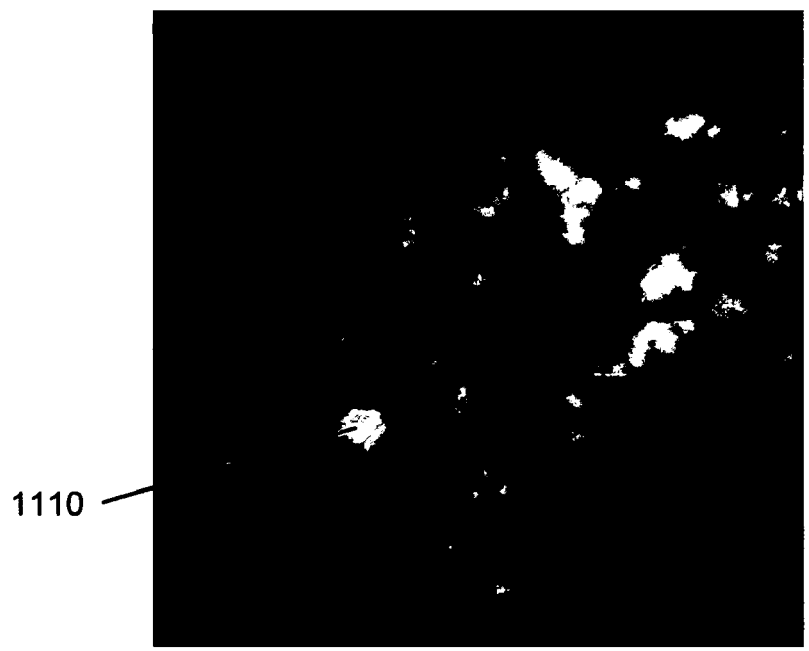
FIG. 11 illustrates an example of one eye image showing age related macular degeneration characterized by drusen of large size distributed over a large area of the image.
Figure 12:
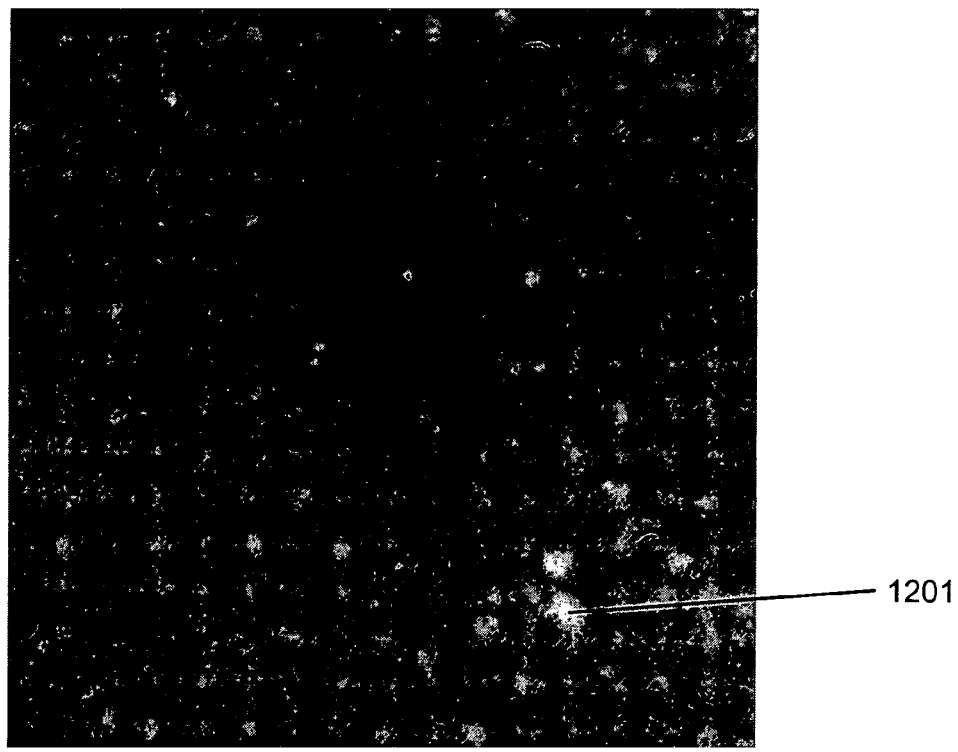
FIG. 12 illustrates an example of a second eye image showing age related macular degeneration characterized by drusen of medium size distributed over a medium area of the image.
Figure 13:
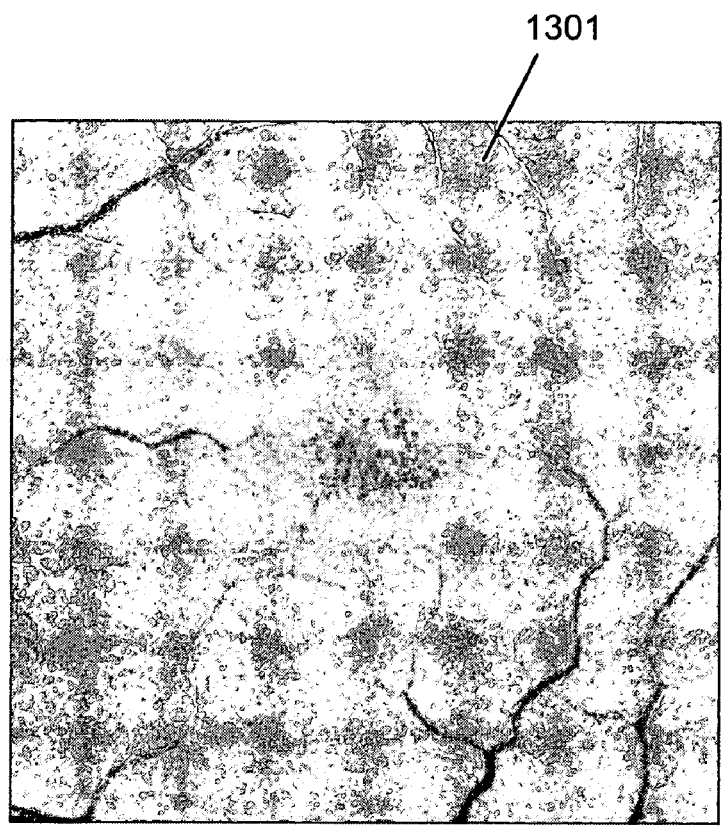
FIG. 13 illustrates an example of a third eye image showing age related macular degeneration characterized by drusen of small size and distributed over a small area of the image.

With respect to the current example, the ARMD subjects present varying numbers of drusen, different size and area distributions, and gray level as illustrated in FIGS. 11, 12, and 13. Referring to FIG. 11, drusen 1110 of large size and covering a large area is depicted. Referring to FIG. 12, drusen 1201 of medium size covering a medium area is depicted. Referring to FIG. 13, drusen 1301 of small size covering a small area is depicted. This variation from subject to subject presents significant difficulty to any segmentation algorithm that strives to apply a universal set of criteria.

Figure 14:
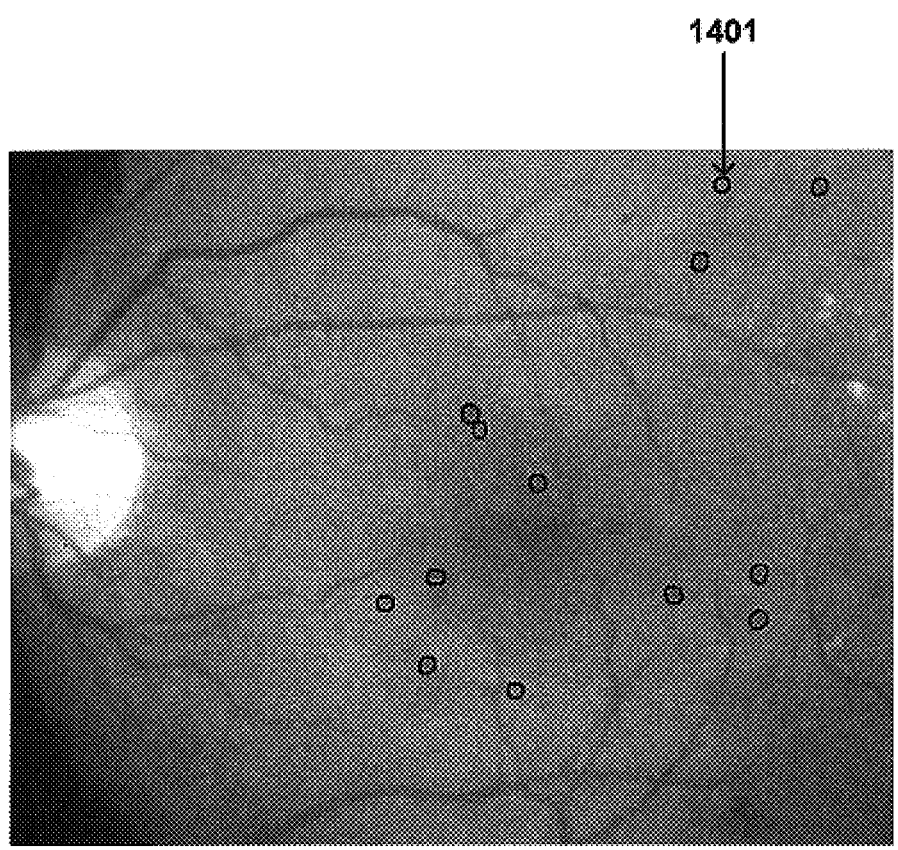
FIG. 14 illustrates an example of one retinal image presenting with early signs of diabetic retinopathy as characterized by a few micro-aneurysms.
Figure 15:
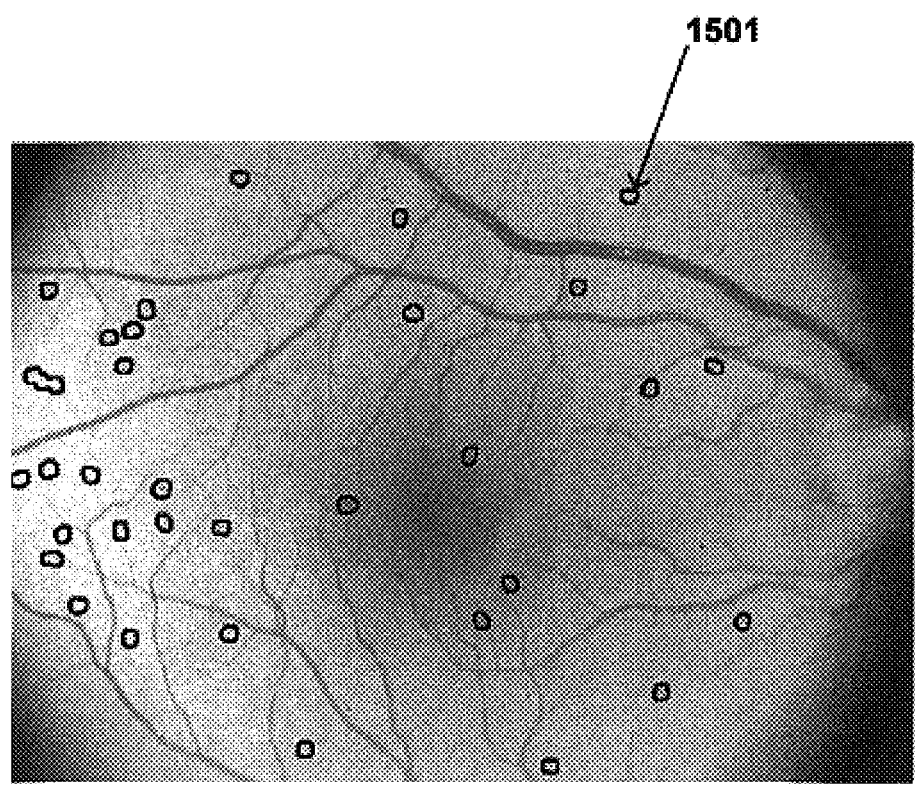
FIG. 15 illustrates an example of one retinal image presenting with more advanced signs of diabetic retinopathy as characterized by a larger number of micro-aneurysms.
Figure 16:
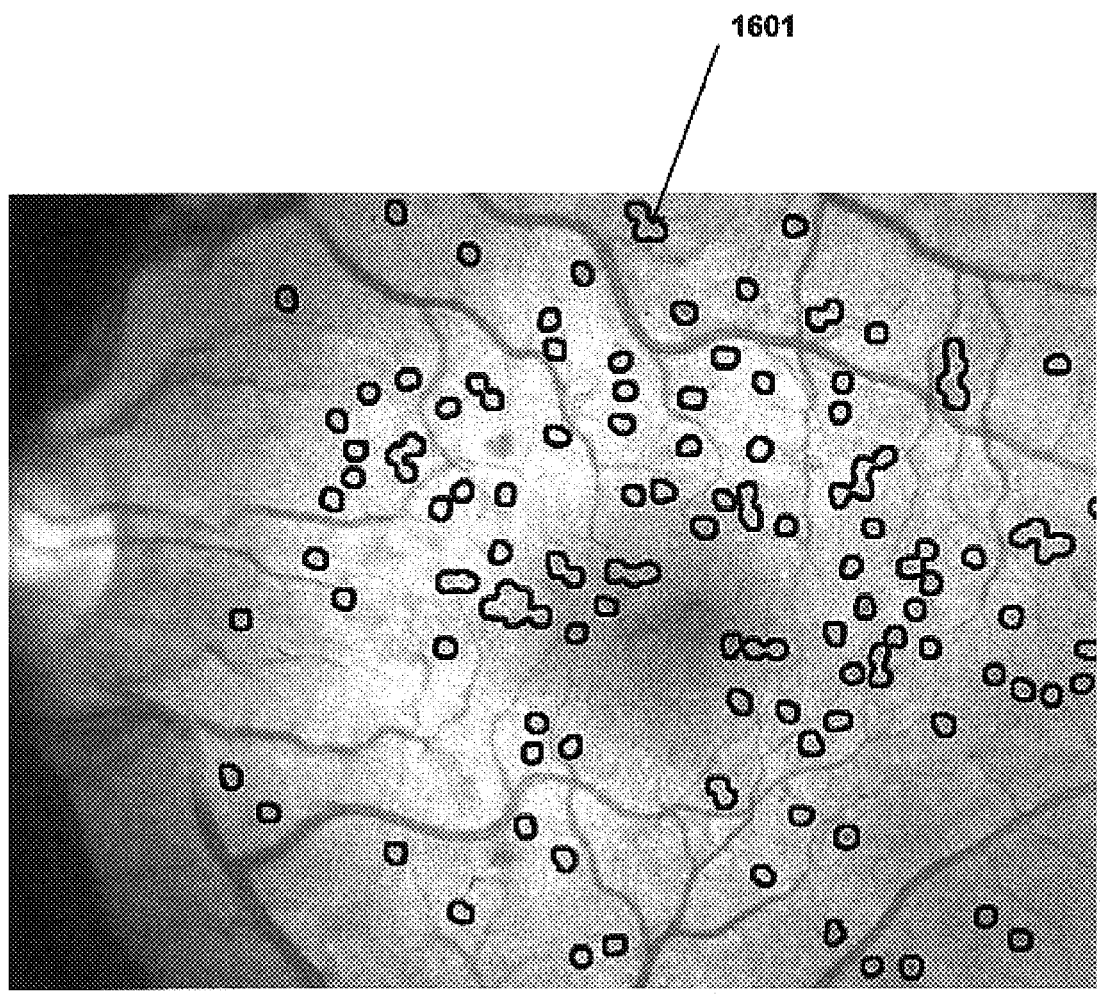
FIG. 16 illustrates an example of one retinal image presenting with advanced signs of diabetic retinopathy as characterized by the perfusion of micro-aneurysms throughout the retina.

With respect to the current example, the ARMD subjects present varying numbers of micro aneurysms, different size and area distributions, and gray level as illustrated in FIGS. 14, 15, and 16. Referring to FIG. 14, micro aneurysms 1401 that are relatively small in number are depicted. Referring to FIG. 15, micro aneurysms 1501 that are relatively large in number are depicted. Referring to FIG. 16, a perfusion of micro-aneurysms 1601 throughout the retina are depicted. Again, this variation from subject to subject presents significant difficulty to any segmentation algorithm that strives to apply a universal set of criteria.

Morphological segmentation suffers from its inability to generalize to a broad range of image types, such as different modalities like color, fluorescein, auto-fluorescence, or infrared. For images of the same modality, but with different resolutions, a morphology segmentation algorithm must be 're-tuned' to account for changes in spatial representation of lesions. If not tuned, the morphology segmentation will not perform satisfactorily.

One embodiment of the present invention is noted above in FIG. 1. A morphological segmentation of an image is customized 150 by tuning the morphology segmentation algorithm parameters, such as structuring elements for dilation and erosion, as applied to each user defined region of an image based upon statistics derived by a feature statistics algorithm for one or more geometric features or aspects within a user defined region of interest for that image. For example, for each of the five regions most proximal to the fovea as defined by the WARMGS grid, symmetry and skewness are calculated from their probability distribution functions (pdf). The same statistics are calculated for the combined center and inner annulus regions. A first feature or aspect that is used to differentiate the retinal images is symmetry and is defined below as If $|\mu-\text{median}| \leq T_1$ and $|\mu-\text{peak}| \leq T_2$, where the thresholds, $T_1$ and $T_2$, are determined using a representative set of images that have been analyzed by a human expert. The thresholds may vary according to the nature of the imaging modality, image acquisition system, a user defined region of the organ being segmented. If the pdf is symmetric, then the user defined region is assigned a symmetry value of 1. If the pdf is asymmetric the region is assigned a symmetry value of 0. Symmetry/asymmetry will represent one of the elements of a feature vector that will be used to describe the nature of the image or user defined region.

A second element of the feature vector that is used to classify the retinal images for establishing the appropriate parameter set for the morphological segmentation algorithm is skewness and is defined below as $$\sigma_x^3 = E[(X - \overline{X})^3] = \sum_i (x_i - \overline{X})^3 f_x(x_i),$$

where f is the distribution function. There are three categories of skewness that are given by the following equations:

If skewness $\geq +T_3$, then category is +1

If skewness $\leq -T_4$, then category is -1

If $-T_4 <$ skewness $> T_3$, then category is 0

Where the thresholds, $T_3$ and $T_4$, are determined using a representative set of images that have been analyzed by a human expert. The thresholds may vary according to the nature of the imaging modality and image acquisition system. For all four thresholds, the optimal values are those that produce the best segmentation accuracy as measured by a metric such as sensitivity and specificity for correctly identifying the targeted lesion.

A feature vector is defined for each user defined region based upon statistical analysis of features of interest. In the present example the statistical analysis delineates the geometrical regional symmetry and skewness, and global symmetry and skewness. All other statistical parameters, e.g. first, second, and higher order, may be used to define the feature vector. The global features are calculated for the combined distribution function of the five regions.

Figure 17:
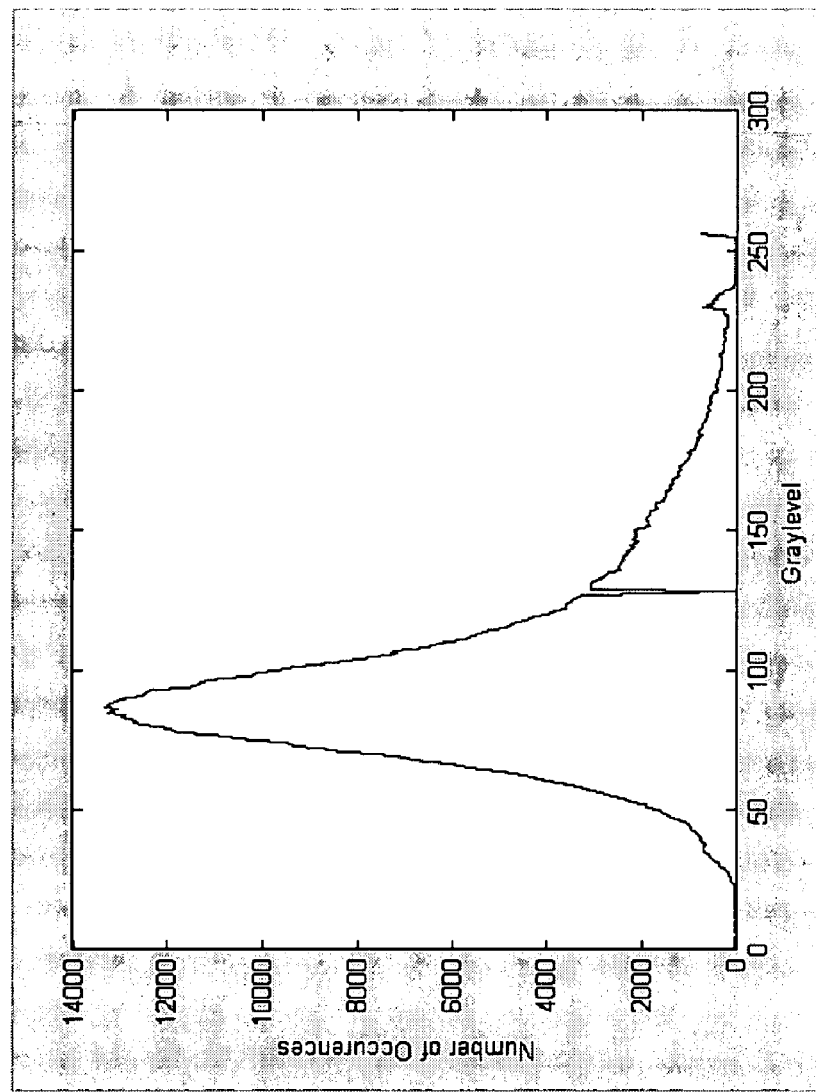
FIG. 17 illustrates histogram generated from FIG. 11 image of eye showing age related macular degeneration.

Referring now to FIG. 17, the effect of applying one embodiment of the present invention to FIG. 11 as noted above is illustrated. The image of the retina displays large sized drusen scattered over large areas of the image. A gray level distribution histogram represents the total drusen size and area found within the user defined region and is illustrated in FIG. 17. The histogram displays asymmetric gray level distribution, positive skewness of 1.27 and the feature vector calculated for this region, [0,1], is classified.

Figure 18:
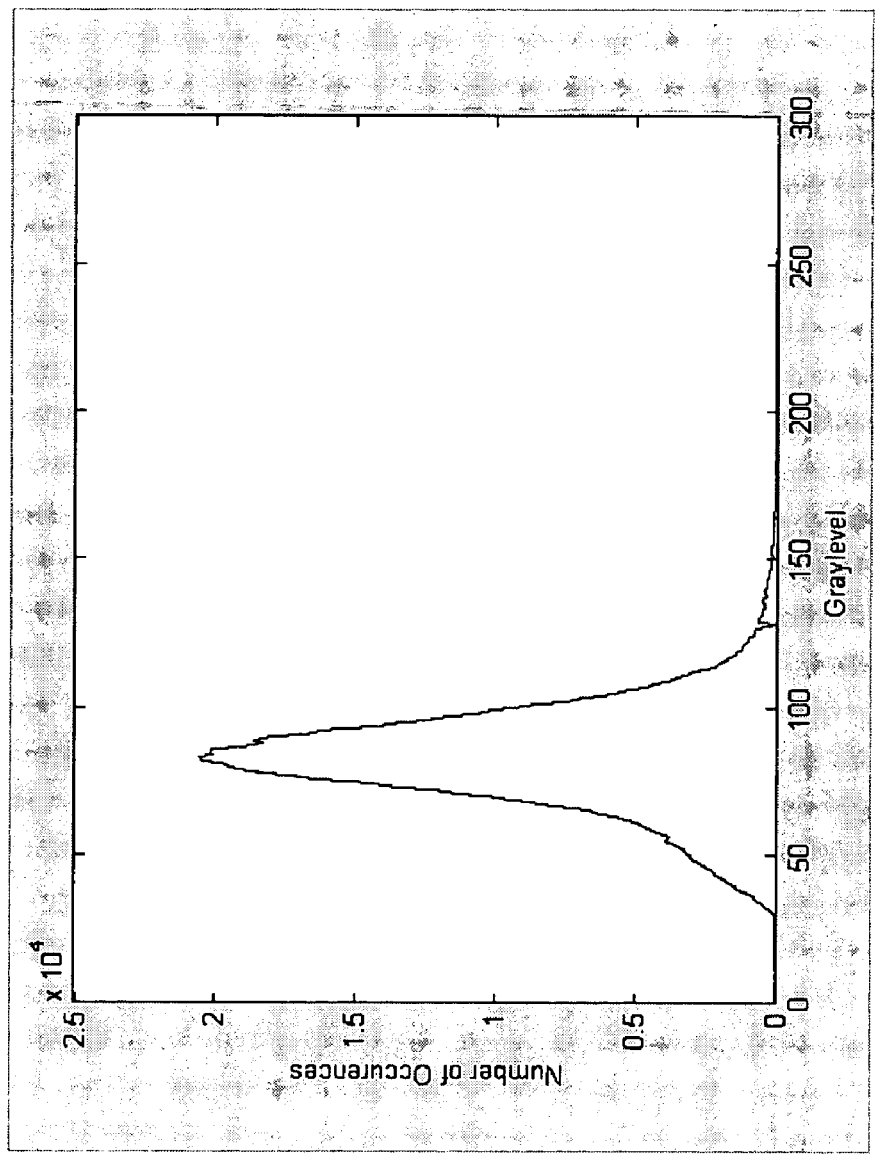
FIG. 18 illustrates histogram generated from FIG. 12 image of eye showing age related macular degeneration.

Referring now to FIG. 18, the effect of applying one embodiment of the present invention to FIG. 12 as noted above is illustrated. The image of the retina displays medium sized drusen scattered over a medium area of the image. The gray level distribution histogram represents the total drusen size and area found within the user defined region and is illustrated in FIG. 18. The histogram displays symmetric gray level distribution, positive skewness of 0.87, having a calculated feature vector for this region of [1,1] which is classified.

Figure 19:
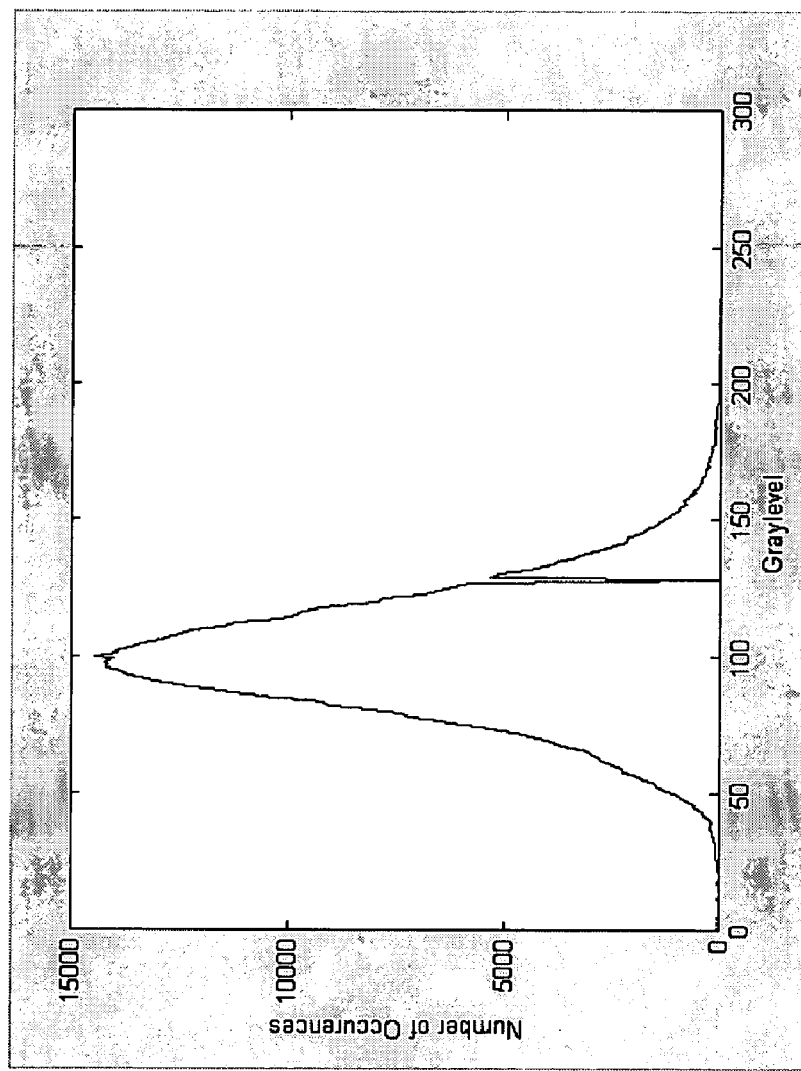
FIG. 19 illustrates histogram generated from FIG. 13 image of eye showing age related macular degeneration.

Referring now to FIG. 19, the effect of applying one embodiment of the present invention to FIG. 13 noted above is illustrated. The image of the retina displays small sized drusen scattered over a small area of the image. The gray level distribution histogram illustrated in FIG. 19 is generated from FIG. 13. The histogram displays symmetric gray level distribution, 0.29 skewness factor, classifying the image as having zero skewness and having a feature vector of [1,0] which is classified.

Feature vectors from each region of interest from the multiple images are classified into different classes based upon the feature vector values wherein feature vectors of the same value are placed in the same class (FIG. 1 at 118).

Morphology segmentation analysis is automatically optimized for each user defined region based upon the feature vector values for that user defined region (FIG. 1 at 120). Variations of gray level morphology analysis are derived by varying input parameters to the algorithm based upon user defined criteria.

In the present example, variants of a gray level morphology algorithm yielding the greatest percentage of correct scoring according to statistical analysis between the automatically segmented image and human graders for the same image are generated by varying the size of the structuring elements. These variable inputs are selected and automatically applied to future images having the same attributes or feature vector values for a user defined region. The values of the input variables for the segmentation algorithms that produced the highest percentage for each category of images are defined as the optimal input parameter settings for segmenting an image with the characteristics and profusion of drusen for that category.

Selecting structuring elements for the gray level analysis algorithm defined as f−min(dilate(f−1,gHL),f); and max(erode(f+1,gHG),f)−f.

Where gHL and gHG are structuring elements in the shape of a disk of given radii R. Numerous variations of gray level morphology analysis are generated by varying the size of the structuring element. The values of the structuring element radii are varied from 5 to 30 pixels in increments of 5 pixels with Lmax>Lmin. (For example (gHL=20, gHG=5), (gHL=20, gHG=10), (gHL=20, gHG=15), (gHL=15, gHG=10)). The size and shape of the structuring element is dependent upon the object of interest that is to be segmented in the image. For example structuring elements with linear characteristics are selected and applied to vessel analysis.

The selection of the adaptive aH parameter for gray level morphology reconstruction is dictated by the input variables. The input variables are determined by the size of the circular structuring elements used to determine the local maxima (Lmax) and local minima (Lmin) in the image. The maxima and minima are used to determine the drusen peaks and borders. Larger structuring elements gHL or gGL produce fewer maxima and minima governing the size and density distribution of detected drusen.

Figure 20:
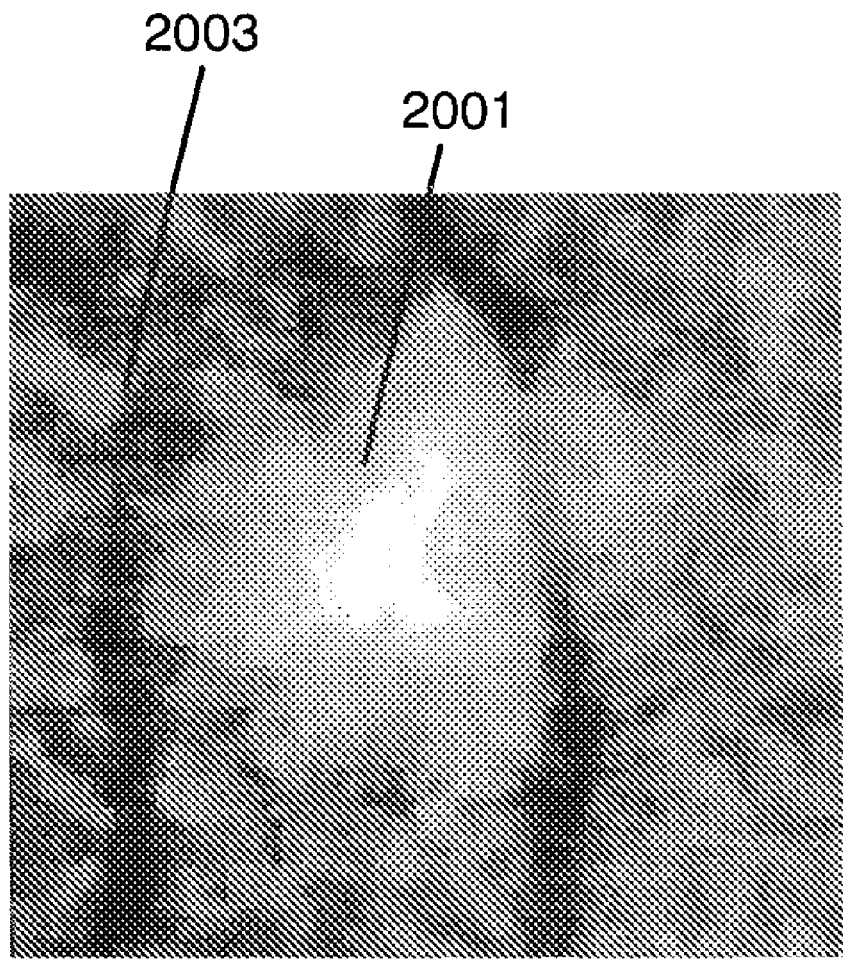
FIG. 20 illustrates gray level spatial representation of typical drusen.
Figure 21:
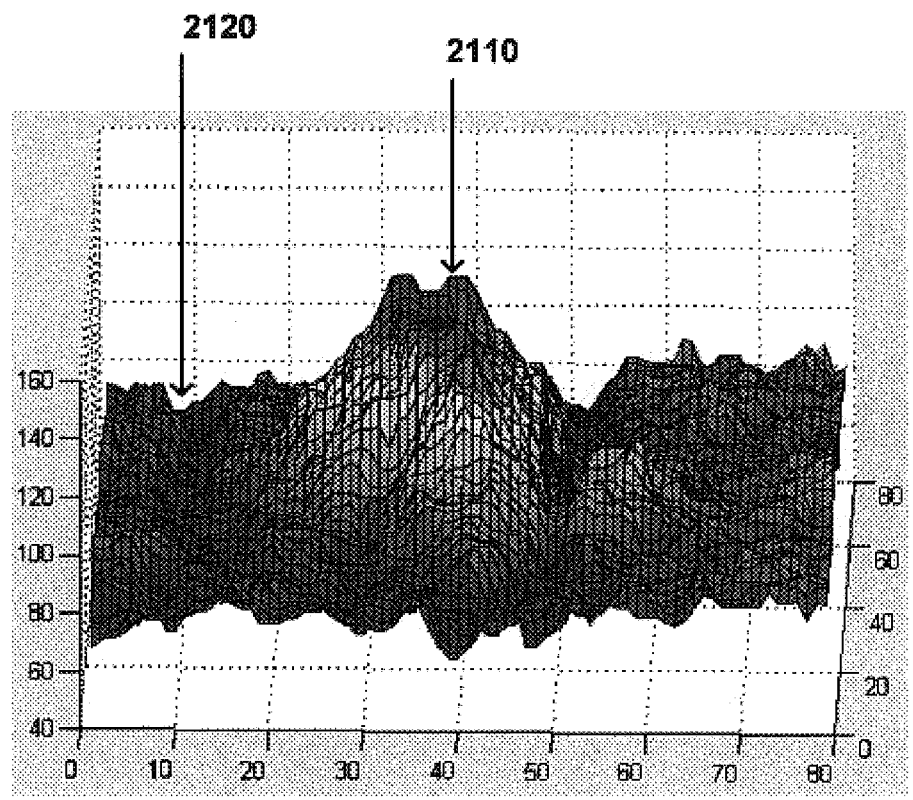
FIG. 21 illustrates spatial-intensity reconstruction 3-D visualization of FIG. 19.

The customized gray level morphology algorithm is applied to each user defined region of an image to isolate peaks" (maxima in the gray level) and "valleys" (minima in the gray level) of a feature as illustrated in FIG. 20 and FIG. 21. The structuring element values are selected based upon feature vectors for a specified region. Referring now to FIG. 20, representations of the minimas in gray level are illustrated as darker areas 2003 in the image, while maximas in gray level are illustrated as brighter areas 2001.

Referring now to FIG. 21, topographical representations of the minimas in gray level are illustrated as valleys 2101 while maximas in gray level are illustrated as peaks 2103.

Referring now to FIG. 20, valleys or minima in gray level 2003 are illustrated as darker regions in the image while maxima in gray level 2001 are illustrated as bright regions in the image.

Referring now to FIG. 21, topographical representations of the minimas in gray level are illustrated as valleys 2120 while maximas in gray level are illustrated as peaks 2110. Regional maximas in an image are found with geodesic reconstruction.

A measure of relative support (Rs) is defined as the Euclidean distance between the maximum gray level and minimum gray level locations found within a given radii R and is calculated starting with the closest minimum. This radius around the maxima identifies the boundary of the drusen.

For each maxima, the relative dynamic (Rd) which is defined as gray level difference between the maximum gray level value and minimum gray level value (within a given radii R) is calculated. This value is the gray level value corresponding to the height of the drusen. For example, if the Rd value is negative for the difference between the maximum and minimum of two points, then the process returns to the previous closer minimum calculated yielding a positive value.

Morphological reconstruction can be thought of conceptually as repeated dilations of a marker image, defined as an original image shifted by a constant value (H), until the contour of a marker image fits under a mask image, defined as an original image. In morphological reconstruction, the peaks in the marker image "spread out," or dilate. The shift is referred to as the H parameter and is the constant by which the mask is shifted downward and corresponds to the threshold size for peak height.

The final dilation or reconstructed image is subtracted from the mask and the H-Maxima image results in the peaks above the flat lines.

According to one embodiment of the present invention, a statistical analysis determines all the optimum setting for all the critical parameters including, structuring element, radius of relative support, and an adaptive critical height parameter that provides the optimal threshold (boundary and height for each lesion present).

Figure 22:
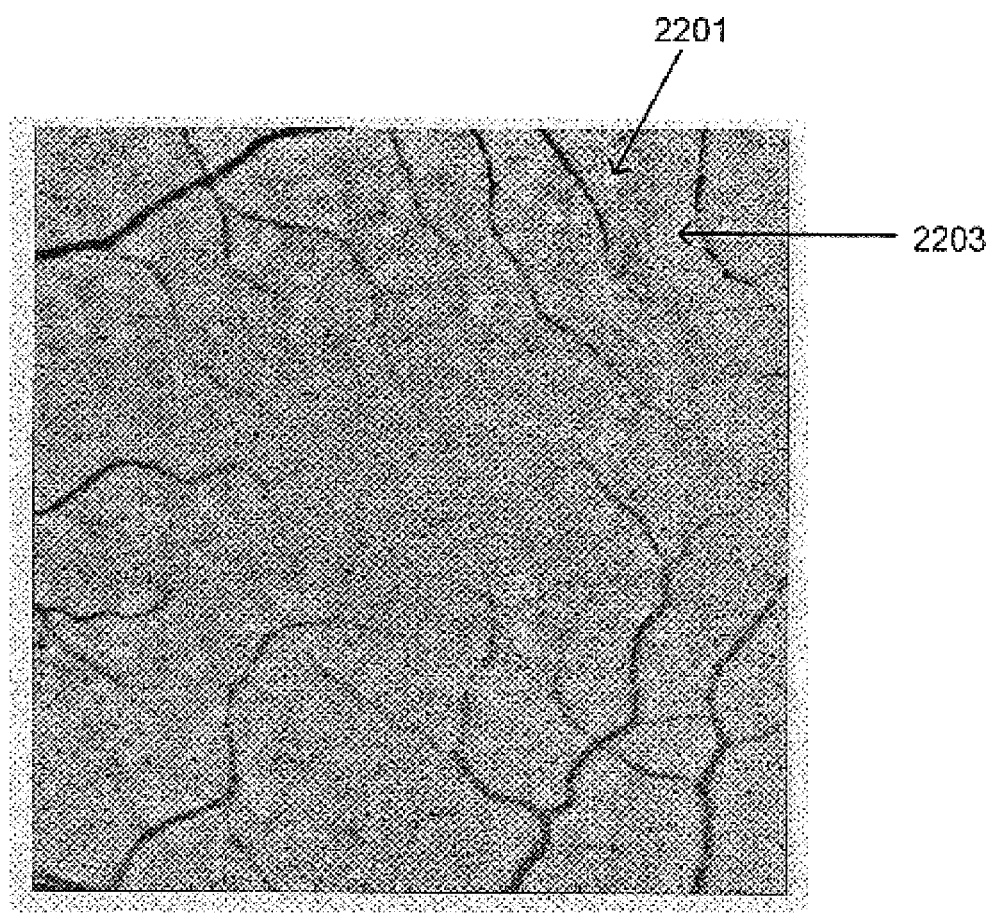
FIG. 22 illustrates an image generated with morphology algorithm according to one embodiment of the present invention.

Referring now to FIG. 22, regional maxima 2201 and minima 2203 are calculated and represented as flecks in the image. The maxima and minima are calculated using input variables of gHL=20 and gHG=10 and are selected to customize the gray level algorithm to a defined feature vector for a user defined region.

Figure 23:
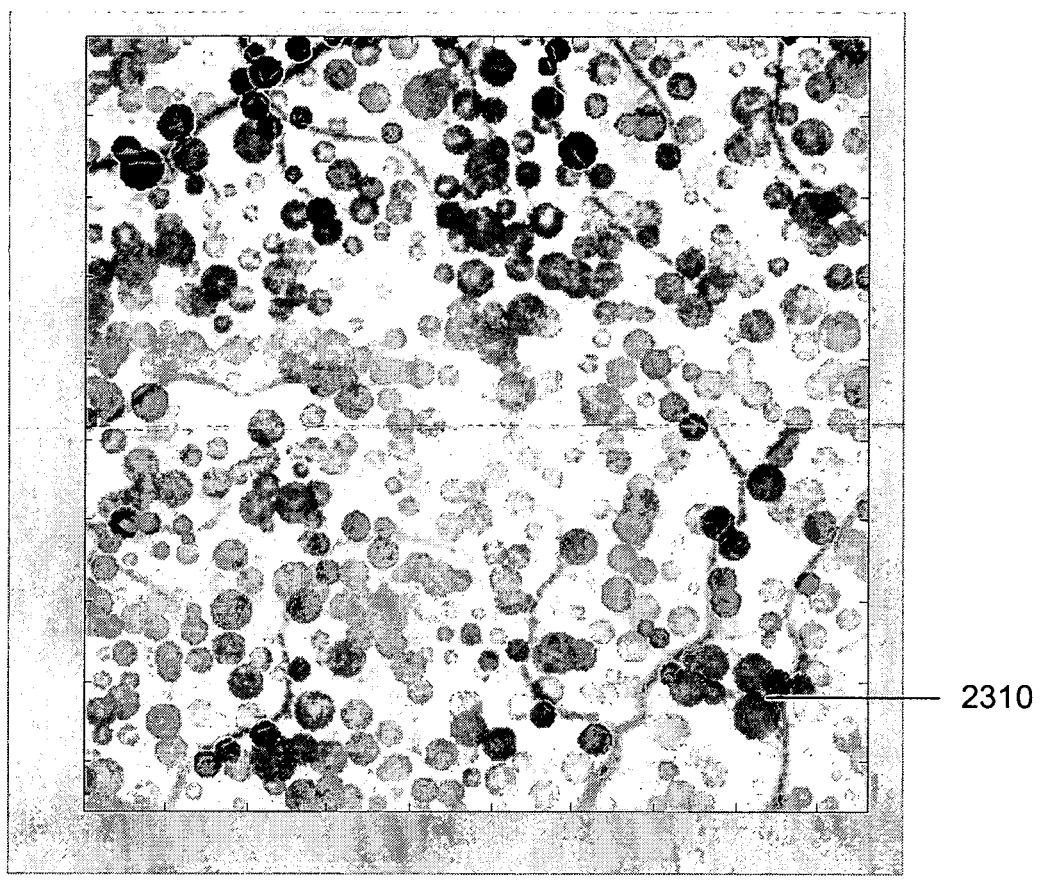
FIG. 23 illustrates an image generated with morphology algorithm according to one embodiment of the present invention

Referring now to FIG. 23 an example marker image displaying circles 2310 which denote the applied shifts (aH) corresponding to the boundary and height of the drusen is illustrated. The aH value is customized in relation to the feature vector. For each maximum identified, a circle with a radius equal to the maximum's regional support (Rs) is drawn around the maximum. The gray level height of the circle is equal to the relative dynamic (Rd) gray level value for the maximum. The Rs and Rd values constitute the (aH) parameter. A marker image is created by subtracting (aH) parameter from the mask image.

Percentage of correct classification or grade is used to evaluate the agreement between the resulting segmentation generated from each variation of the algorithm analyzed and the grader's size and area category/score. The morphology algorithm variation that produced the highest percentage agreement with the manual grader is assigned to that particular region category. For example, for regions which have a regional and global asymmetric and positive skewness classification, a structuring element (gHL) of a given radius is used to find the maxima and a structuring element (gHG) of a given radius is used to find the minima.

Enhancing digital images is further achieved by removing noise to produce further enhanced digital images using the present system and method. The present system and method aids in screening and diagnosis patient via images showing abnormal pathologies in patients with disease. Digital images meeting a minimum image quality are analyzed using one embodiment of the present invention.

Digital images are analyzed by segmenting potential features of interest (PFOI) yielding FOI (features of interest) from the total pool of PFOIs to be considered for analysis. The total pool of PFOI contains both true features of interest and false features of interest, i.e. objects that are segmented by the morphology algorithm, but are not true features of interest. The objective is retaining the maximum number of true features of interest while removing maximum number of false features of interest enhances the image for the FOI to be analyzed for screening, diagnosis and further segmentation.

For example, one embodiment of the present invention minimizes false positive features in an image to be analyzed by describing the potential features of interest according to one or more aspects or descriptive characteristics (such as shape, color and combination thereof) that discriminates features with the desired selected aspect from features without the desired selected aspect within the pool of potential features of interest. More particularly, to select for a particular feature of interest for example micro-aneurysms, from the pool of potential features of interest thereby enhancing the image for true micro-aneurysms, aspects that are associated with true micro-aneurysms or true features of interest are selected. The image can be classified as from a patient presenting with diabetic retinopathy or normal based upon the number of features of interest or MAs in the image via the method disclosed.

Multiple regions in an image may be separately filtered and enhanced. Enhanced regions can be reintegrated to provide a unified enhanced image. Weighting of the enhanced regions further enhances the information within the image for segmenting, screening, diagnosing and any combination thereof. Additionally, separate images of an organ may also be filtered to select for features of interest. The separate images are weighted and combined such that the features of interest in each image having been segmented, are screened, and diagnosed according to the weighted values for the enhanced images. Determination of the weighted values of each region or each image is made by a search algorithm for example a genetic algorithm.

An enhanced image produced for a feature of interest for example MAs is used in initial diagnosis of disease for example diabetic retinopathy based upon a critical threshold for the number of true positive features of interest in the image. A critical threshold may be determined from ground truth from a previous method such as data from a human grader.

The validity of the critical threshold is based on the quality of the images and the setting from the segmentation parameter. Data from different cameras will require a re-analysis of the images and will likely produce a new threshold.

EXAMPLE

An aspect-based feature classification is applied to images of the retina for automatically classifying features such as micro-aneurysms for monitoring the health of the patient. A substantial number of features in the image as acquired are not micro-aneurysms but instead represent noise and can be distinguished by aspects or descriptors such as shape and color. Examples of aspects representing shape and color are hue, saturation, aspect ratio, roundness, complexity, edge sharpness, compactness and area. Other aspects of shape and color will be apparent to one of ordinary skill in the art. Values are assigned to the PFOI for the selected aspect and identify which PFOI are removed from the image as noise. Aspects or descriptors that characterize MAs are identified using an aspect-based feature classification algorithm to analyze the potential features of interest in an image, selecting for MAs (features of interest) by maximizing the number of true features of interest (features that are MAs) while minimizing the false features of interest (features that are not MAs). Aspects that best characterize MAs and the threshold value for the aspects in an image are defined by ground truth, which in the current example is human grader data. The ground truth may vary between systems having different instruments and between images having different resolution for a given feature of interest.

The aspects of a feature of interest that enhance an image for that selected feature of interest may be identified using a search algorithm for example a genetic algorithm. The order in which the aspects are sequentially applied to the selected feature of interest may also be ordered via a genetic algorithm.

Genetic algorithms (GAs) are adaptive search algorithms premised on the evolutionary principles of natural selection. GAs simulate the evolutionary processes of nature, specifically Darwin's hypothesis of survival of the fittest. GAs are an exploitation of evolutionary processes to optimally search within a defined search space for a good solution. Instead of starting the search in a single place, GAs start the search simultaneously in different regions, thus avoiding the trap of local minima. Since GAs are task independent optimizers, the only requirements are 1) the definition and implementation of the genetic representation, and 2) the definition of the objective function. A potential solution (called an individual in GA terminology) is defined by a set of genes (the threshold and the weights to apply to each field) defined below as $C_N$ and T. The objective function is ruled by the clinical sensitivity and specificity:

$$MAX[a \times Sensitivity + (1-a) \times Specificity]$$

$$a=[0.4-0.7]$$

The sensitivity and specificity are determined by using the equation below where N represents the number of objects for each field, C is the scaling coefficient, and T is the threshold for the total number of objects.

$$(C_1 \times N_1 + C_2 \times N_2 + C_3 \times N_3 - T)\{>0, \text{Abnormal and } \leq 0, \text{Normal}$$

The GA was used to find the best $C_N$ and T such that very high sensitivity and specificity are achieved.

Iterative analysis of the image enhances the image for the desired feature of interest. The iterative analysis includes selecting a pool of potential features of interest, characterizing individuals in the pool of potential feature of interest according to a selected aspect of the feature of interest the user wishes to enhance the image for, selecting a threshold value for the aspect selected and filtering or removing those features in the pool not meeting a minimum threshold value. The order in which aspect analysis is applied to the features in the pool impacts the outcome or degree to which the image has been enhances for a feature of interest.

Further, the unique feature of interest that an image is enhanced for will differ from organ to organ and from disease to disease. Therefore, aspects (such as shape and color) of the feature of interest will change accordingly. Further still, the ordered sequential analysis with regard to selected aspects for a given feature of interest in different organs will vary. However, the order in which selected aspects are applied to the image via the aspect-based feature classification is determined by the degree of sensitivity and specificity desired by the user. Given a specified sensitivity and specificity for the enhanced image, a genetic algorithm selects a preferred order for the aspects to be applied to the potential feature of interest. The specificity and sensitivity selected impacts the degree to which the image is enhanced.

An input variable for specificity or sensitivity tunes the system and method selecting for the threshold value to apply for each aspect of the feature of interest that is filtered. Enhancement of the image for the greatest specificity or sensitivity is determined through application of a genetic algorithm.

A priori information about the shape, color, and intensity characteristics of a lesion, such as a micro-aneurysm can be exploited to further eliminate the error in the image segmentation. This information may include features such as aspect ratio, complexity, roundness, compactness, area, edge sharpness, hue and saturation.

Hue and saturation are based on the color and intensity information. Aspect ratio, similar to eccentricity, may be used as a measure of an object's shape. It is given as the ratio of the major axis to minor axis length in which a value of 1 constitutes a circle. Many lesions are elliptical or are elongated in some way, so the value of the aspect ratio needs to be slightly more than one to tolerate these deviations from the ideal circle. Edge sharpness is the average difference in intensity of an object's boundary pixels to the pixels inside the object, taken from the green channel only. Area is the total number of pixels inside an object. Complexity describes the irregularity of the objects shape and is measured by taking the ratio of an object's the perimeter to the area of the object.

Given a set of human expert analyzed images to establish statistically the mean and variance of each of the lesion's geometrical features, a search algorithm, such as a genetic algorithm, is used to determine the order in which to apply the feature-based screening of false positive objects while retaining the maximum number of true positive lesions, e.g. MAs. At each step of the object-screening process one of the features, according to the optimal order established by the search algorithm, the sensitivity and specificity of the segmented image is improved by removing objects that do not meet the statistical characteristics of the expert's segmented images.

Figure 24:
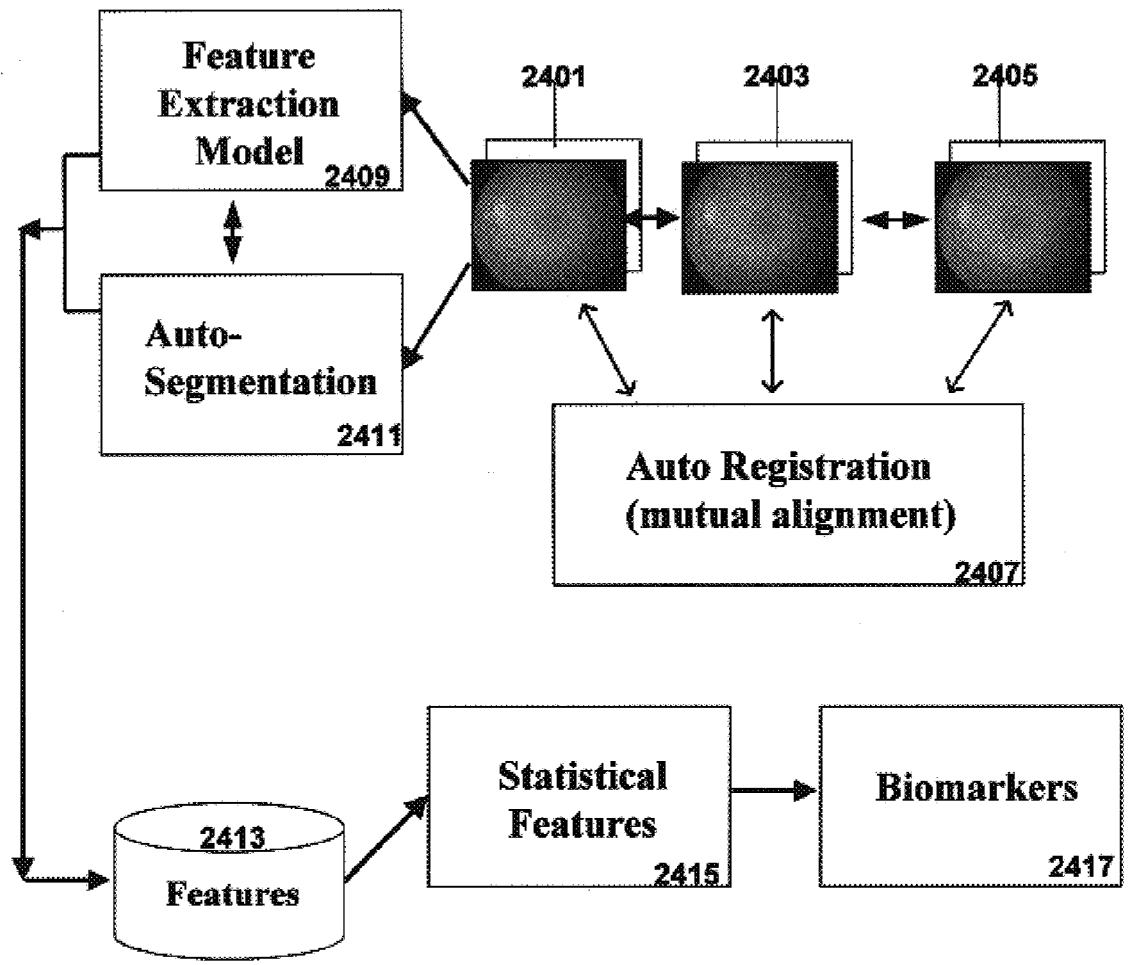
FIG. 24 illustrates an automated analysis of an image that characterizes the image in terms of features such as texture, colorization and morphology according to one embodiment of the present invention.

In analyzing images of the same organ, such as the retina, several sample images varying in perspective or modality may be available. Each of these images may provide different results in terms of the presence or the number of lesions that are segmented. A means for combining the information (data or image fusion) is to apply an optimization program, such as a genetic algorithm, to determine the relative importance or weight to assign to each image in order to attain the greatest sensitivity and specificity Referring now to FIG. 24, another embodiment of the present invention is illustrated. Images of an organ having a feature of interest are acquired over time. Images may be acquired using any one of a number of modalities for example color images, Indocyanine green (ICG) videos, and Fluorescein-Angiogram (FA) videos (or any combination of modalities). Other modalities such as, visible spectral, infrared, and autofluorescence, for example are also acceptable singly or in combination. All modalities and all longitudinal images are registered to a universal image to allow temporal analysis or longitudinal differencing.

Features of interest such as texture, coloration and or fractal dimensions of, the vasculature or biomarkers such a lipid deposits or chemical accumulation are extracted from the image. These features are used to characterize each image and each modality. Other features, such as fill rates of retinal vessels, are calculated from video such as FA, for example, fill characteristics are also found for the retinal background to detect other anomalies. The feature data are stored in a data base for further statistical analysis.

Images may be digitized and then processed to automatically segment the affected regions. Texture and other mathematically relevant features such as co-occurrence statistics are used to characterize the image as videos. Images are registered longitudinally so that changes are tracked and measured precisely and accurately.

"Feature data" are stored in a database and may be compared with the manually graded images. The two are statistically analyzed to determine correlations between the manually segmented image and the segmented images generated in accordance with embodiments of the system and methods described herein. Biomarkers, such as drusen, in combination with other features such as the vasculature and metabolism within the organ of interest relate to the state of disease, or the risk for progression of a disease, for example ARMD.

Image $t_1$ 2401, $t_2$ 2403, and $t_n$ 2405 are acquired at different times during a longitudinal study and images $t_2$-$t_n$ are automatically registered or mutually aligned with image $t_1$ which is also known as the universal image for the subject. Each feature of interest within the image is automatically segmented 2411 based upon features extracted at the feature extraction model 2411. The statistical features 2413 are characterized and stored in a database. Biomarkers are identified that correlate with the health of the organ and system. The precise registration, i.e. alignment, of images and the segmentation of lesions enables one to monitor accurately changes due to the natural course of the disease or due to the effects of a drug treatment.

Figure 25:
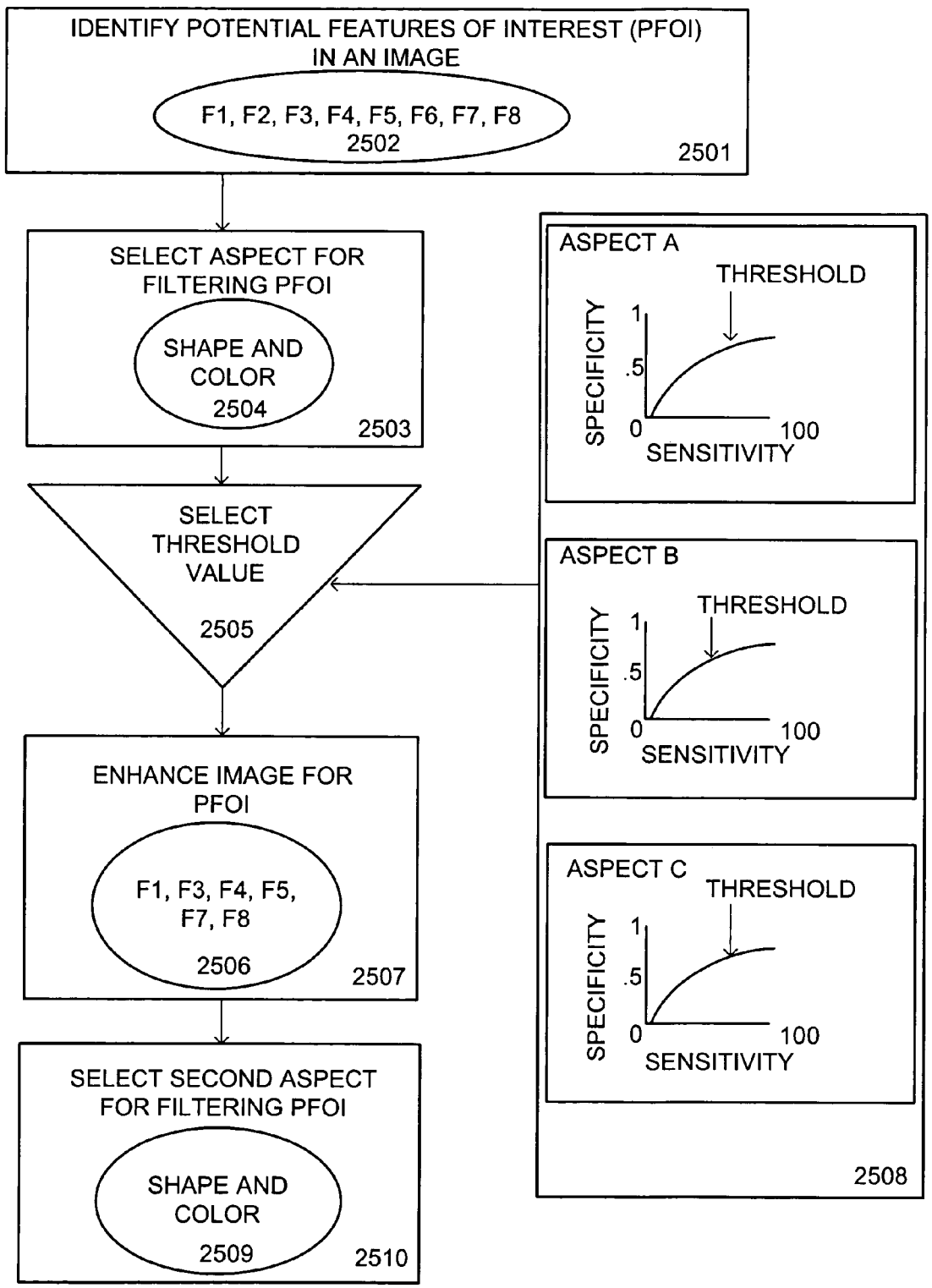
FIG. 25 illustrates a flow chart for a process according to a second embodiment of the present invention.

Referring now to FIG. 25, through the morphological segmentation 2501 a number of potential features are detected which may include both true features and false features, i.e. objects that are not true features. Because these features will have other aspects or characteristics, such as color, size, shape, etc., these characteristics may be used as a means for further filtering of the false features 2503. Based on known statistical distributions of these characteristics, provided by a "ground truth" set of data manually analyzed by a human expert, these characteristics can be used to filter the potential filters. The threshold of a given characteristic is selected 2505 based on the resulting sensitivity and specificity combination as presented in receiver operating characteristic (ROC) curves 2508. The result is an improved accuracy in the classification of the potential features, i.e. maximize the true features, while minimizing the false features 2507. The process is repeated for all other feature characteristics or aspects 2510 until further improvements in sensitivity and specificity cannot be achieved.

An automated system and method for generating segmented images of the eye and analysis of the segmented images of the eye has now been illustrated. The system and method of the present invention, however, can be applied to assess the morphology of other eye structures such as microaneurysms, cancer and exudates, affected by systemic or local pathology such as hypertension, diabetes, cancer, and other ocular manifestations of systemic disease. The system and method can also be applied to other organs such as lung and skin.

It will be apparent to those skilled in the art that other types of equipment that record the necessary images may be employed and related statistical and analysis techniques may be used without departing from the scope of the invention as claimed. Further, the embodiments described herein are illustrative only and are not meant as limitations on the claims hereof.

What is claimed is:

1. A method for characterizing a digital image comprising:
   identifying a feature of interest within the image;
   applying a feature algorithm to the image based on the feature of interest to determine a feature vector for the image;
   selecting among predefined gray level morphology algorithm input variables unique for the image, based upon the determined feature vector for the image, to provide a customized gray level morphology algorithm to apply to the image;
   applying the customized gray level morphology algorithm to the image to provide enhanced image data; and
   calculating feature statistics based on the enhanced image data.

2. The method of claim 1, wherein the feature algorithm comprises a symmetry algorithm.

3. The method of claim 1, wherein the feature algorithm comprises a skewness algorithm.

4. A method for characterizing a retinal image comprising:
   identifying a feature of interest within the retinal image;
   applying a feature algorithm to the retinal image based on the feature of interest to determine a feature vector for the retinal image;
   selecting among predefined gray level morphology algorithm input variables for the retinal image, based upon the feature vector for the retinal image, to provide a customized gray level morphology algorithm for the retinal image;
   applying the customized gray level morphology algorithm to the retinal image to provide enhanced retinal image data; and
   calculating feature statistics based on the enhanced retinal image data.

5. The method of claim 4, wherein the feature algorithm comprises a symmetry algorithm.

6. The method of claim 4, wherein the feature algorithm comprises a skewness algorithm.

7. A method for characterizing a digital image comprising:
   defining the digital image into plural defined regions;
   identifying features of interest within the defined regions;
   applying feature algorithms to each of the defined regions based on the features of interest to determine a feature vector for each defined region;
   selecting among predefined morphology algorithm input variables for each defined region, based upon the feature vector for that respective defined region, to provide a customized morphology algorithm for each defined region;
   applying the customized morphology algorithms to each respective defined region to provide enhanced image data; and
   calculating feature statistics based on the enhanced image data.

8. The method of claim 7, wherein the feature algorithm comprises a symmetry algorithm.

9. The method of claim 7, wherein the feature algorithm comprises a skewness algorithm.

10. A method for characterizing a digital image of a retina, the method comprising:
    defining the digital image into one or more defined regions;
    identifying a feature of interest within the defined regions;
    applying a symmetry algorithm and a skewness algorithm to each of the defined regions based on the feature of interest to determine a feature vector for each defined region;
    selecting among predefined morphology algorithm input variables for each defined region, based upon the feature vector for that respective defined region, to provide customized morphology algorithms for each defined region;

applying the customized morphology algorithms to each respective defined region to provide regional results having enhanced image data;
combining the regional results to form an enhanced image; and
calculating feature statistics for the enhanced image.

11. A computer program product for enabling a computer to characterize a digital image, the computer program product comprising
software instructions for enabling the computer to perform predetermined operations, and
a computer readable medium embodying the software instructions;
wherein the predetermined operations comprise:
identifying a feature of interest within the image;
applying a feature algorithm to the image based on the feature of interest to determine a feature vector for the image;
selecting among predefined morphology algorithm input variables for the image, based upon the feature vector for the image, to provide a customized morphology algorithm for the image;
applying the customized morphology algorithm to the image to provide enhanced image data; and
calculating feature statistics based on the enhanced image data.

12. A computer program product for enabling a computer to characterize a digital image of a retina, the computer program product comprising
software instructions for enabling the computer to perform predetermined operations, and
a computer readable medium embodying the software instructions;
wherein the predetermined operations comprise:
defining the digital image into one or more defined regions;
identifying a feature of interest within the defined regions;
applying a symmetry algorithm and a skewness algorithm to each of the defined regions based on the feature of interest to determine a feature vector for each defined region;
selecting among predefined morphology algorithm input variables for each defined region, based upon the feature vector for that respective defined region, to provide customized morphology algorithms for each defined region;
applying the customized morphology algorithms to each respective defined region to provide regional results having enhanced image data;
combining the regional results to form an enhanced image; and
calculating feature statistics for the enhanced image.

13. A system for mathematically characterizing a digital image, the system comprising:
a programmable machine;
software instruction for operating on the programmable machine and adapted to cause the programmable machine to execute:
identifying a feature of interest within the image;
applying a feature algorithm to the image based on the feature of interest to determine a feature vector for the image;
selecting among predefined morphology algorithm input variables for the image, based upon the feature vector for the image, to provide a customized morphology algorithm for the image;
applying the customized morphology algorithm to the image to provide enhanced image data; and
calculating feature statistics based on the enhanced image data.

14. A system for mathematically characterizing a digital image of a retina, the system comprising:
a programmable machine;
software instruction for operating on the programmable machine and adapted to cause the programmable machine to execute:
defining the digital image into one or more defined regions;
identifying a feature of interest within the defined regions;
applying a symmetry algorithm and a skewness algorithm to each of the defined regions based on the feature of interest to determine a feature vector for each defined region;
selecting among predefined morphology algorithm input variables for each defined region, based upon the feature vector for that respective defined region, to provide customized morphology algorithms for each defined region;
applying the customized morphology algorithms to each respective defined region to provide regional results having enhanced image data;
combining the regional results to form an enhanced image; and
calculating feature statistics for the enhanced image.

15. A method for characterizing features of interest in a digital image, the method comprising:
identifying a set of one or more potential features of interest (PFOIs) to characterize in the image;
characterizing each of the PFOIs quantitatively with respect to a selected aspect and obtaining a respective aspect value;
selecting a filter threshold value from a receiver operating characteristic curve specific for the selected aspect, wherein the filter threshold value is selected based upon a user input variable; and
filtering the PFOIs with a filter specific to the selected aspect and using the selected filter threshold value, wherein filtering removes from the set of identified PFOIs any of the PFOIs with a quantitative value for the aspect that is equal to or less than the filter threshold value thereby producing a filtered set of identified PFOIs;
wherein the selected aspect comprises a first ordered aspect;
wherein the steps of characterizing, selecting, and filtering are repeated for each of one or more subsequent ordered aspects;
wherein, after repeating the steps of characterizing, selecting, and filtering for each of one or more subsequent ordered aspects, any PFOIs remaining in the set of identified PFOIs are then characterized as being features of interest.

16. The method for characterizing features of interest of claim 15, wherein the first and subsequent ordered aspects have their order determined via a genetic algorithm.

17. The method for characterizing features of interest of claim 16, wherein the genetic algorithm selects for maximization of true positive characterization of features of interest.

18. The method for characterizing features of interest of claim 16, wherein the genetic algorithm selects for minimization of false positive characterization of features of interest.

19. The method for characterizing features of interest of claim 16, wherein the genetic algorithm selects for minimization of false positive characterization of features of interest without substantial sacrifice of true positive characterization of features of interest.

20. A method for assessing symptoms of disease by characterizing features of interest in a digital image of an organ, the method comprising:
- identifying a set of one or more potential features of interest (PFOIs) to characterize in the image, the potential features of interest being lesions;
- characterizing each of the PFOIs quantitatively with respect to a selected aspect and obtaining a respective aspect value;
- selecting a filter threshold value from a receiver operating characteristic curve specific for the selected aspect, wherein the filter threshold value is selected based upon a user input variable; and
- filtering the PFOIs with a filter specific to the selected aspect and using the selected filter threshold value, wherein filtering removes from the set of identified PFOIs any of the PFOIs with a quantitative value for the aspect that is equal to or less than the filter threshold value thereby producing a filtered set of identified PFOIs;
- wherein the selected aspect comprises a first ordered aspect;
- wherein the steps of characterizing, selecting, and filtering are repeated for each of a second through sixth ordered aspects;
- wherein, after repeating the steps of characterizing, selecting, and filtering for each of the ordered aspects, any PFOIs remaining in the set of identified PFOIs are then characterized as being features of interest.

21. The method for assessing symptoms of disease of claim 20, wherein the first ordered aspect comprises aspect ratio, the second ordered aspect comprises edge sharpness, the third ordered aspect comprises complexity, the fourth ordered aspect comprises roundness, the fifth ordered aspect comprises hue, and the sixth ordered aspect comprises saturation.

22. A computer program product for enabling a computer to characterize features of interest in a digital image, the computer program product comprising
- software instructions for enabling the computer to perform predetermined operations, and
- a computer readable medium embodying the software instructions;
- wherein the predetermined operations comprise:
  - identifying a set of one or more potential features of interest (PFOIs) to characterize in the image;
  - characterizing each of the PFOIs quantitatively with respect to a selected aspect and obtaining a respective aspect value;
  - selecting a filter threshold value from a receiver operating characteristic curve specific for the selected aspect, wherein the filter threshold value is selected based upon a user input variable; and
  - filtering the PFOIs with a filter specific to the selected aspect and using the selected filter threshold value, wherein filtering removes from the set of identified PFOIs any of the PFOIs with a quantitative value for the aspect that is equal to or less than the filter threshold value thereby producing a filtered set of identified PFOIs;
  - wherein the selected aspect comprises a first ordered aspect;
  - wherein the steps of characterizing, selecting, and filtering are repeated for each of one or more subsequent ordered aspects;
  - wherein, after repeating the steps of characterizing, selecting, and filtering for each of one or more subsequent ordered aspects, any PFOIs remaining in the set of identified PFOIs are then characterized as being features of interest.

23. A computer program product for enabling a computer to assess symptoms of disease by characterizing features of interest in a digital image of an organ, the computer program product comprising
- software instructions for enabling the computer to perform predetermined operations, and
- a computer readable medium embodying the software instructions;
- wherein the predetermined operations comprise:
  - identifying a set of one or more potential features of interest (PFOIs) to characterize in the image, the potential features of interest being lesions;
  - characterizing each of the PFOIs quantitatively with respect to a selected aspect and obtaining a respective aspect value;
  - selecting a filter threshold value from a receiver operating characteristic curve specific for the selected aspect, wherein the filter threshold value is selected based upon a user input variable; and
  - filtering the PFOIs with a filter specific to the selected aspect and using the selected filter threshold value, wherein filtering removes from the set of identified PFOIs any of the PFOIs with a quantitative value for the aspect that is equal to or less than the filter threshold value thereby producing a filtered set of identified PFOIs;
  - wherein the selected aspect comprises a first ordered aspect;
  - wherein the steps of characterizing, selecting, and filtering are repeated for each of a second through sixth ordered aspects;
  - wherein, after repeating the steps of characterizing, selecting, and filtering for each of the ordered aspects, any PFOIs remaining in the set of identified PFOIs are then characterized as being features of interest.

24. The computer program product of claim 23, wherein the first ordered aspect comprises aspect ratio, the second ordered aspect comprises edge sharpness, the third ordered aspect comprises complexity, the fourth ordered aspect comprises roundness, the fifth ordered aspect comprises hue, and the sixth ordered aspect comprises saturation.

25. A system for characterizing features of interest in a digital image, the system comprising:
- a programmable machine;
- software instruction for operating on the programmable machine and adapted to cause the programmable machine to execute:
  - identifying a set of one or more potential features of interest (PFOIs) to characterize in the image;
  - characterizing each of the PFOIs quantitatively with respect to a selected aspect and obtaining a respective aspect value;
  - selecting a filter threshold value from a receiver operating characteristic curve specific for the selected aspect, wherein the filter threshold value is selected based upon a user input variable; and
  - filtering the PFOIs with a filter specific to the selected aspect and using the selected filter threshold value, wherein filtering removes from the set of identified PFOIs any of the PFOIs with a quantitative value for the aspect that is equal to or less than the filter threshold value thereby producing a filtered set of identified PFOIs;

wherein the selected aspect comprises a first ordered aspect;

wherein the steps of characterizing, selecting, and filtering are repeated for each of one or more subsequent ordered aspects;

wherein, after repeating the steps of characterizing, selecting, and filtering for each of one or more subsequent ordered aspects, any PFOIs remaining in the set of identified PFOIs are then characterized as being features of interest.

26. A system for assessing symptoms of disease by characterizing features of interest in a digital image of an organ, the system comprising:

a programmable machine;

software instruction for operating on the programmable machine and adapted to cause the programmable machine to execute:

identifying a set of one or more potential features of interest (PFOIs) to characterize in the image, the potential features of interest being lesions;

characterizing each of the PFOIs quantitatively with respect to a selected aspect and obtaining a respective aspect value;

selecting a filter threshold value from a receiver operating characteristic curve specific for the selected aspect, wherein the filter threshold value is selected based upon a user input variable; and filtering the PFOIs with a filter specific to the selected aspect and using the selected filter threshold value, wherein filtering removes from the set of identified PFOIs any of the PFOIs with a quantitative value for the aspect that is equal to or less than the filter threshold value thereby producing a filtered set of identified PFOIs;

wherein the selected aspect comprises a first ordered aspect;

wherein the steps of characterizing, selecting, and filtering are repeated for each of a second through sixth ordered aspects;

wherein, after repeating the steps of characterizing, selecting, and filtering for each of the ordered aspects, any PFOIs remaining in the set of identified PFOIs are then characterized as being features of interest.

27. The system for assessing symptoms of disease of claim 26, wherein the first ordered aspect comprises aspect ratio, the second ordered aspect comprises edge sharpness, the third ordered aspect comprises complexity, the fourth ordered aspect comprises roundness, the fifth ordered aspect comprises hue, and the sixth ordered aspect comprises saturation.

28. A method for characterizing images comprising:

obtaining a first digital image of a feature to create a universal image of the feature;

obtaining a subsequent digital image of the feature;

registering the subsequent image to the universal image to create a registered image;

defining the registered image into regions;

identifying features of interest within the defined regions;

applying one or more feature vector algorithms to determine feature vectors for each defined region;

classifying feature vectors from each defined region into classes;

applying an optimized morphology algorithm to each defined region; and calculating feature statistics for features in a registered image.

* * * * *